US007586949B1

(12) United States Patent
Barany et al.

(10) Patent No.: US 7,586,949 B1
(45) Date of Patent: Sep. 8, 2009

(54) INTERLEAVING DATA OVER FRAMES COMMUNICATED IN A WIRELESS CHANNEL

(75) Inventors: Peter A. Barany, McKinney, TX (US); Chandra S. Bontu, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 2117 days.

(21) Appl. No.: 09/715,787

(22) Filed: Nov. 17, 2000

Related U.S. Application Data

(60) Provisional application No. 60/194,310, filed on Apr. 3, 2000.

(51) Int. Cl.
*H04J 3/24* (2006.01)
(52) U.S. Cl. .................. 370/474; 370/335; 455/450
(58) Field of Classification Search .......... 370/347, 370/468, 348, 336, 337, 340, 341, 335, 345, 370/442, 473, 474, 476; 455/450, 509, 516
See application file for complete search history.

(56) References Cited

U.S. PATENT DOCUMENTS

| | | | | |
|---|---|---|---|---|
| 5,091,942 A | * | 2/1992 | Dent | 380/46 |
| 5,182,753 A | * | 1/1993 | Dahlin et al. | 714/749 |
| 5,327,576 A | * | 7/1994 | Uddenfeldt et al. | 370/333 |
| 5,625,877 A | | 4/1997 | Dunn et al. | 455/34.1 |
| 5,663,957 A | * | 9/1997 | Dent | 370/347 |
| 5,729,538 A | * | 3/1998 | Dent | 370/347 |
| 5,751,708 A | | 5/1998 | Eng et al. | 370/389 |
| 5,754,537 A | | 5/1998 | Jamal | 370/330 |
| 5,812,545 A | | 9/1998 | Liebowitz et al. | 370/337 |
| 5,831,978 A | * | 11/1998 | Willars et al. | 370/335 |
| 5,910,949 A | | 6/1999 | Bilstrom et al. | 370/337 |
| 5,918,204 A | * | 6/1999 | Tsurumaru | 704/214 |
| 5,930,248 A | | 7/1999 | Langlet et al. | 370/347 |
| 5,963,548 A | * | 10/1999 | Virtanen | 370/335 |

(Continued)

OTHER PUBLICATIONS

U.S. Appl. No. 09/716,136, Peter A. Barany et al., filed Nov. 17, 2000.

(Continued)

*Primary Examiner*—Chi H Pham
*Assistant Examiner*—Kevin Mew
(74) *Attorney, Agent, or Firm*—Trop, Pruner & Hu, P.C.

(57) ABSTRACT

A mobile communications system includes a radio access network, such as an Enhanced General Packet Radio Service (EGPRS) network, in which mobile stations are able to enter into a discontinuous transmission (DTX) mode. During DTX mode of a first mobile station that is allocated a channel portion (e.g., a time slot of a frame), the radio access network is able to multiplex traffic from another mobile station onto the same channel portion. A mechanism is provided to enable the first mobile station to send a request for re-allocation of the channel portion. The request includes a real-time fast access associated control channel (RTFACCH) resource request message (RTRRM). In response to the RTRRM, the radio access network sends an RTFACCH resource assignment message (RTUAM). An interleaving scheme is also provided for half-rate mobile stations, in which one set of traffic frames are interleaved over plural bursts according to a first algorithm and a second set of traffic frames are interleaved over plural bursts according to a second algorithm.

31 Claims, 18 Drawing Sheets

U.S. PATENT DOCUMENTS

| | | | | |
|---|---|---|---|---|
| 5,966,378 | A | 10/1999 | Hamalainen | 370/348 |
| 6,006,105 | A * | 12/1999 | Rostoker et al. | 455/552.1 |
| 6,021,124 | A | 2/2000 | Haartsen | 370/336 |
| 6,031,832 | A | 2/2000 | Turina | 370/348 |
| 6,035,434 | A * | 3/2000 | Sazzad et al. | 714/776 |
| 6,064,664 | A * | 5/2000 | Kim | 370/335 |
| 6,072,787 | A * | 6/2000 | Hamalainen et al. | 370/335 |
| 6,084,865 | A * | 7/2000 | Dent | 370/321 |
| 6,101,465 | A * | 8/2000 | Sazzad et al. | 704/229 |
| 6,108,550 | A | 8/2000 | Wiorek et al. | 455/447 |
| 6,134,230 | A * | 10/2000 | Olofsson et al. | 370/337 |
| 6,185,199 | B1 * | 2/2001 | Zehavi | 370/335 |
| 6,201,970 | B1 * | 3/2001 | Suzuki et al. | 455/450 |
| 6,225,888 | B1 | 5/2001 | Juopperi | 340/5.8 |
| 6,240,076 | B1 | 5/2001 | Kanerva et al. | 370/330 |
| 6,286,122 | B1 | 9/2001 | Alanara | 714/781 |
| 6,292,664 | B1 | 9/2001 | Ostrup et al. | 455/453 |
| 6,327,256 | B1 | 12/2001 | Paivike et al. | 370/337 |
| 6,373,831 | B1 * | 4/2002 | Secord et al. | 370/342 |
| 6,404,753 | B1 | 6/2002 | Chien et al. | 370/337 |
| 6,426,980 | B1 * | 7/2002 | Gorday et al. | 375/295 |
| 6,449,484 | B1 * | 9/2002 | Grubeck et al. | 455/450 |
| 6,473,418 | B1 * | 10/2002 | Laroia et al. | 370/344 |
| 6,487,184 | B1 | 11/2002 | Pecen et al. | 370/329 |
| 6,490,260 | B1 * | 12/2002 | Hwang | 370/335 |
| 6,532,225 | B1 * | 3/2003 | Chang et al. | 370/341 |
| 6,535,497 | B1 * | 3/2003 | Raith | 370/336 |
| 6,563,839 | B1 | 5/2003 | Hallenstal et al. | 370/437 |
| 6,574,202 | B1 * | 6/2003 | Himayat et al. | 370/329 |
| 6,584,089 | B1 | 6/2003 | Honkasalo et al. | 370/338 |
| 6,597,680 | B1 | 7/2003 | Lindskog et al. | 370/347 |
| 6,608,827 | B1 * | 8/2003 | Austin | 370/348 |
| 6,657,982 | B1 | 12/2003 | Fong et al. | 370/336 |
| 6,658,064 | B1 * | 12/2003 | Rotola-Pukkila et al. | 375/295 |
| 6,671,267 | B1 * | 12/2003 | Yano et al. | 370/335 |
| 6,707,859 | B1 * | 3/2004 | Kinnunen et al. | 375/316 |
| 6,724,813 | B1 | 4/2004 | Jamal et al. | 375/219 |
| 6,785,524 | B2 * | 8/2004 | Elliot | 455/232.1 |
| 6,868,075 | B1 * | 3/2005 | Narvinger et al. | 370/335 |
| 6,870,821 | B2 * | 3/2005 | Sebire | 370/328 |
| 6,925,067 | B2 * | 8/2005 | Jou | 370/329 |
| 7,227,836 | B2 * | 6/2007 | Kong et al. | 370/209 |
| 2001/0024432 | A1 * | 9/2001 | Zehavi et al. | |
| 2001/0040883 | A1 * | 11/2001 | Chang et al. | 370/344 |
| 2001/0046843 | A1 | 11/2001 | Alanara et al. | 455/95 |
| 2004/0062274 | A1 * | 4/2004 | Hakansson et al. | |
| 2004/0136344 | A1 * | 7/2004 | Kim et al. | 370/335 |
| 2005/0176435 | A1 * | 8/2005 | Fauconnier et al. | 455/450 |
| 2006/0203781 | A1 * | 9/2006 | Yano et al. | 370/335 |

OTHER PUBLICATIONS

U.S. Appl. No. 09/716,150, Peter A. Barany et al., filed Nov. 17, 2000.

Nokia, "Geran Radio Access Bearers." pp. 1-16 (Feb. 2000).

European Telecommunications Standards Institute, "Digital Cellular Telecommunication System (Phase 2+); Discontinuous Transmission (DTX) for Adaptive Multi-Rate (AMR) speech Traffic CHannels (GSM) 06.93 version 7.3.0 Release 1998)," Draft ETSI EN 301 707 V7.3.0 (Dec. 1999), pp. 1-15 (1999).

European Telecommunications Standards Institute, Digital Cellular Telecommunication System (Phase 2+); GEneral Packet Radio Service (GPRS); Mobile Station (MS)-Base Station (BSS) interface; Radio Link Control/Medium Access Control (RLC/MAC) protocol (GSM 04.60 version 8.5.0 Release 1999), pp. 1-278 (1999).

* cited by examiner

FIG. 4B

Table 700:

| # | Content |
|---|---|
| 25 | IDLE |
| 26 | U3:DATA |
| 27 | U3:DATA |
| 28 | U3:DATA |
| 29 | U3:DATA |
| 30 | U2: SF #k+4 / SF #k+5 |
| 31 | U2: SF #k+5 / SF #k+6 |
| 32 | U2: SF #k+5 / SF #k+6 |
| 33 | U2: SF #k+6 / SF #k+7 |
| 34 | U1: U |
| 35 | U1: U |
| 36 | U1: U |
| 37 | U1: U |
| 38 | PTCCH |
| 39 | U2: SF #k+6 / SF #k+7 |
| 40 | U2: SF #k+7 / SF #k+8 |
| 41 | U2: SF #k+7 / SF #k+8 |
| 42 | U2: SF #k+8 / SF #k+9 |
| 43 | U3:DATA |
| 44 | U3:DATA |
| 45 | U3:DATA + U1: R |
| 46 | U3: DATA |
| 47 | U2: SF #k+8 / SF #k+9 |
| 48 | U2: SF #k+9 / SF #k+10 |
| 49 | U2: SF #k+9 / SF #k+10 |
| 50 | U2: SF #k+10 / SF #k+11 |
| 51 | IDLE |

Table 702:

| # | Content |
|---|---|
| 25 | IDLE |
| 26 | U1:SF #0 / SF #1 |
| 27 | U1:SF #1 / SF #2 |
| 28 | U1:SF #1 / SF #2 |
| 29 | U1:SF #2 / SF #3 |
| 30 | U3:DATA |
| 31 | U3:DATA |
| 32 | U3:DATA |
| 33 | U3:DATA |
| 34 | U1:SF #2 / SF #3 |
| 35 | U1:SF #3 / F |
| 36 | U1:SF #3 / F |
| 37 | U1:F / F |
| 38 | PTCCH |
| 39 | U3:DATA |
| 40 | U3:DATA |
| 41 | U3:DATA |
| 42 | U3:DATA |
| 43 | U3:DATA |
| 44 | U3:DATA |
| 45 | U3:DATA |
| 46 | U1: A |
| 47 | U3:DATA |
| 48 | U3:DATA |
| 49 | U3:DATA |
| 50 | U3:DATA |
| 51 | IDLE |

| # | 700 |
|---|---|
| 25 | IDLE |
| 26 | U3:DATA |
| 27 | U3:DATA |
| 28 | U3:DATA |
| 29 | U3:DATA |
| 30 | U2: SF #k+4 / SF #k+5 |
| 31 | U2: SF #k+5 / SF #k+6 |
| 32 | U2: SF #k+5 / SF #k+6 |
| 33 | U1: SF #k+6 / SF #k+7 |
| 34 | U1: U |
| 35 | U1: U |
| 36 | U1: U |
| 37 | U1: U |
| 38 | PTCCH |
| 39 | U2: SF #k+6 / SF #k+7 |
| 40 | U2: SF #k+7 / SF #k+8 |
| 41 | U2: SF #k+7 / SF #k+8 |
| 42 | U2: SF #k+8 / SF #k+9 |
| 43 | U3:DATA |
| 44 | U3:DATA |
| 45 | U3: DATA + U1: R |
| 46 | U3:DATA |
| 47 | U2: SF #k+8 / SF #k+9 |
| 48 | U2: SF #k+9 / SF #k+10 |
| 49 | U2: SF #k+9 / SF #k+10 |
| 50 | U2: SF #k+10 / SF #k+11 |
| 51 | IDLE |

| # | 702 |
|---|---|
| 25 | IDLE |
| 26 | U1:SF #0 / SF #1 |
| 27 | U1:SF #1 / SF #2 |
| 28 | U1:SF #1 / SF #2 |
| 29 | U1:SF #2 / SF #3 |
| 30 | U3:DATA |
| 31 | U3:DATA |
| 32 | U3:DATA |
| 33 | U3:DATA |
| 34 | U1:SF #2 / SF #3 |
| 35 | U1:SF #3 / F |
| 36 | U1:SF #3 / F |
| 37 | U1:F / F |
| 38 | PTCCH |
| 39 | U3:DATA |
| 40 | U3:DATA |
| 41 | U3:DATA |
| 42 | U3:DATA |
| 43 | U3:DATA |
| 44 | U3:DATA |
| 45 | U3:DATA |
| 46 | U1: A |
| 47 | U3:DATA |
| 48 | U3:DATA |
| 49 | U3:DATA |
| 50 | U3:DATA |
| 51 | IDLE |

FIG. 5B

UPLINK

| FN \ TN | 0 | 1 | 2 | 3 | 4 | 5 | 6 | 7 |
|---|---|---|---|---|---|---|---|---|
| 0 | SF #0 / SF#1 | | | | | | | |
| 1 | SF #0 / SF#1 | | | | | | | |
| 2 | SF #0 / SF#1 | | | | | | | |
| 3 | SF #0 / SF#1 | | | | | | | |
| 4 | SF #1 / SF#2 | | | | | | | |
| 5 | SF #1 / SF#2 | | | | | | | |
| 6 | SF #1 / SF#2 | | | | | | | |
| 7 | SF #1 / SF#2 | | | | | | | |
| 8 | SF #2 / F | | | | | | | |
| 9 | SF #2 / F | | | | | | | |
| 10 | SF #2 / F | | | | | | | |
| 11 | SF #2 / F | | | | | | | |
| 12 | PTCCH | | | | | | | |
| 13 | MB | | | | | | | |
| 14 | MB | | | | | | | |
| 15 | MB | | | | | | | |
| 16 | MB | | | | | | | |
| 17 | MB | | | | | | | |
| 18 | MB | | | | | | | |
| 19 | MB | | | | | | | |
| 20 | MB | | | | | | | |
| 21 | U | | | | | | | |
| 22 | U | | | | | | | |
| 23 | U | | | | | | | |
| 24 | U | | | | | | | |

DOWNLINK

| FN \ TN | 0 | 1 | 2 | 3 | 4 | 5 | 6 | 7 |
|---|---|---|---|---|---|---|---|---|
| 0 | MB | | | | | | | |
| 1 | MB | | | | | | | |
| 2 | MB | | | | | | | |
| 3 | MB | | | | | | | |
| 4 | MB | | | | | | | |
| 5 | MB | | | | | | | |
| 6 | MB | | | | | | | |
| 7 | MB | | | | | | | |
| 8 | U | | | | | | | |
| 9 | U | | | | | | | |
| 10 | U | | | | | | | |
| 11 | U | | | | | | | |
| 12 | PTCCH | | | | | | | |
| 13 | O / SF#0 | | | | | | | |
| 14 | O / SF#0 | | | | | | | |
| 15 | O / SF#0 | | | | | | | |
| 16 | O / SF#0 | | | | | | | |
| 17 | SF #0 / SF#1 | | | | | | | |
| 18 | SF #0 / SF#1 | | | | | | | |
| 19 | SF #0 / SF#1 | | | | | | | |
| 20 | SF #0 / SF#1 | | | | | | | |
| 21 | SF #1 / SF#2 | | | | | | | |
| 22 | SF #1 / SF#2 | | | | | | | |
| 23 | SF #1 / SF#2 | | | | | | | |
| 24 | SF #1 / SF#2 | | | | | | | |

FIG. 6A

| | | | | | | | |
|---|---|---|---|---|---|---|---|
| 25 | IDLE | | | | | | |
| 26 | MB | | | | | | |
| 27 | MB | | | | | | |
| 28 | MB | | | | | | |
| 29 | MB | | | | | | |
| 30 | MB | | | | | | |
| 31 | MB | | | | | | |
| 32 | MB | | | | | | |
| 33 | MB | | | | | | |
| 34 | U | | | | | | |
| 35 | U | | | | | | |
| 36 | U | | | | | | |
| 37 | U | | | | | | |
| 38 | PTCCH | | | | | | |
| 39 | MB | | | | | | |
| 40 | MB | | | | | | |
| 41 | MB | | | | | | |
| 42 | MB+R | | | | | | |
| 43 | MB | | | | | | |
| 44 | MB | | | | | | |
| 45 | MB | | | | | | |
| 46 | MB | | | | | | |
| 47 | O / SF#0 | | | | | | |
| 48 | O / SF#0 | | | | | | |
| 49 | O / SF#0 | | | | | | |
| 50 | O / SF#0 | | | | | | |
| 51 | IDLE | | | | | | |

B9 = {39, 40, 41, 42}
B10 = {43, 44, 45, 46}
B11 = {47, 48, 49, 50}

710

| | | | | | | | |
|---|---|---|---|---|---|---|---|
| 25 | IDLE | | | | | | |
| 26 | SF #2 / SF#3 | | | | | | |
| 27 | SF #2 / SF#3 | | | | | | |
| 28 | SF #2 / SF#3 | | | | | | |
| 29 | SF #2 / SF#3 | | | | | | |
| 30 | SF #3 / SF#4 | | | | | | |
| 31 | SF #3 / SF#4 | | | | | | |
| 32 | SF #3 / SF#4 | | | | | | |
| 33 | SF #3 / SF#4 | | | | | | |
| 34 | SF #4 / F | | | | | | |
| 35 | SF #4 / F | | | | | | |
| 36 | SF #4 / F | | | | | | |
| 37 | SF #4 / F | | | | | | |
| 38 | PTCCH | | | | | | |
| 39 | MB | | | | | | |
| 40 | MB | | | | | | |
| 41 | MB | | | | | | |
| 42 | MB | | | | | | |
| 43 | A | | | | | | |
| 44 | | | | | | | |
| 45 | | | | | | | |
| 46 | | | | | | | |
| 47 | U | | | | | | |
| 48 | U | | | | | | |
| 49 | U | | | | | | |
| 50 | U | | | | | | |
| 51 | IDLE | | | | | | |

B10 = {43, 44, 45, 46}

712

Maximum Delay

FIG. 7B

INTERLEAVING DATA OVER FRAMES COMMUNICATED IN A WIRELESS CHANNEL

CROSS-REFERENCE TO RELATED APPLICATION

This application claims benefit under 35 U.S.C. §119(e) to U.S. Provisional Application Ser. No. 60/194,310, entitled "GSM/EDGE Radio Access Network (GERAN) Real-Time Fast Associated Control Channel (RTFACCH): Conversational Traffic Class—Half-Rate," filed Apr. 3, 2000.

TECHNICAL FIELD

This invention relates generally to communicating data over a wireless channel.

BACKGROUND

Mobile communications systems, such as cellular or personal communications services (PCS) systems, are made up of a plurality of cells. Each cell provides a radio communications center in which a mobile station establishes a call with another mobile station or wireline unit connected to a public switched telephone network (PSTN). Each cell includes a radio base station, with each base station connected to a base station controller or mobile switching center that controls processing of calls between or among mobile stations or mobile stations and PSTN units.

Various wireless protocols exist for defining communications in a mobile network. One such protocol is a time-division multiple access (TDMA) protocol, such as the TIA/EIA-136 standard provided by the Telecommunications Industry Association (TIA). With TIA/EIA-136 TDMA, each channel carries a frame that is divided into six time slots to support multiple (3 or 6) mobile stations per channel. Other TDMA-based systems include Global System for Mobile (GSM) communications systems, which use a TDMA frame divided into eight time slots (or burst periods).

Traditional speech-oriented wireless systems, such as the TIA/EIA-136 and GSM TDMA systems, utilize circuit-switched connection paths in which a line is occupied for the duration of the connection between a mobile station and the mobile switching center. Such a connection is optimum for communications that are relatively continuous, such as speech. However, data networks such as local area networks (LANs), wide area networks (WANs), and the Internet use packet-switched connections, in which communication between nodes on a communications link is by data packets. Each node occupies the communications link only for as long as the node needs to send or receive data packets. Popular forms of communications over packet-switched networks include electronic mail, web browsing, text chat sessions, file downloads, and other types of data transfers.

Several packet-switched wireless connection protocols have been proposed to provide more efficient connections between a mobile station and a data network. One such protocol is the General Packet Radio Service (GPRS) protocol, which complements existing GSM systems. Another technology that builds upon GPRS is the Enhanced Data Rate for Global Evolution (EDGE) technology, which offers even higher data rates. The enhancement of GPRS by EDGE is referred to as Enhanced GPRS (EGPRS). Another variation of EGPRS is the COMPACT technology. GPRS, EGPRS, and COMPACT are established by the European Telecommunications Standards Institute (ETSI).

The packet-switched wireless connection protocols provide efficient access to data networks, such as the Internet, LANs, WANs, and the like. A growing use of such data networks is for voice and other forms of real-time or streaming communications (such as video, audio and video, multimedia, and so forth). Various protocols have been defined to enable such real-time or streaming communications over the data networks, with one popular type of packet-switched network being the Internet Protocol (IP) network.

In some wireless communication systems, mobile stations are able to enter into a discontinuous transmission (DTX) mode. When a mobile station is not transmitting, such as when a user is not talking, and there is no other traffic to communicate, the mobile station can enter into DTX mode to save power and also to reduce interference with other mobile stations. During DTX, a channel between the mobile station and the base station is idle (that is, no traffic is being communicated). However, other mobile stations do not have access to the idle channel, since the channel is dedicated to the voice user. This is to ensure that the voice user can quickly start communicating over the channel once the user resumes talking. As a result, available bandwidth is wasted in some mobile communications systems.

SUMMARY

In general, according to one embodiment, a system for use in a mobile communications network comprises a wireless interface adapted to receive traffic over a wireless channel portion from a first mobile station involved in half-rate communications. A controller is adapted to receive an indication that the first mobile station has entered discontinuous transmission mode and to multiplex traffic from a second mobile station onto the wireless channel portion while the first mobile station is in discontinuous transmission mode.

In general, according to another embodiment, a method of interleaving data over a plurality of frames comprises interleaving the data according to a first algorithm over plural frames communicated over a wireless channel for a first set of data; and interleaving the data according to a second algorithm over plural frames communicated over the wireless channel for a second set of data.

Some embodiments of the invention may include one or more of the following advantages. Bandwidth of channel portions in a wireless communications system is increased by multiplexing traffic from another mobile station when a first mobile station has stopped transmitting real-time, interactive traffic (e.g., voice), such as during discontinuous transmission (DTX) mode. A reliable mechanism is provided to ensure that the first mobile station can quickly gain access back to the channel portion if the first mobile station starts transmitting again. This may be particularly useful when the traffic communicated by the first mobile station includes voice or other forms of real-time, interactive data. An interleaving scheme of data from half-rate mobile stations enable an efficient multiplexing of data from another mobile station while the half-rate mobile station is in DTX mode.

Other features and advantages will become apparent from the following description, from the drawings, and from the claims.

BRIEF DESCRIPTION OF THE DRAWINGS

FIGS. 4A-4B and 5A-5B illustrate multiframes for carrying traffic and control signaling between the mobile station and the base station, with statistical multiplexing illustrated for traffic of a half-rate mobile station that has entered DTX mode and of another mobile station.

FIGS. 6A-6B and 7A-7B illustrate multiframes for carrying traffic and control signaling between the mobile station and the base station, with statistical multiplexing illustrated for traffic of a full-rate mobile station that has entered DTX mode and of another mobile station.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
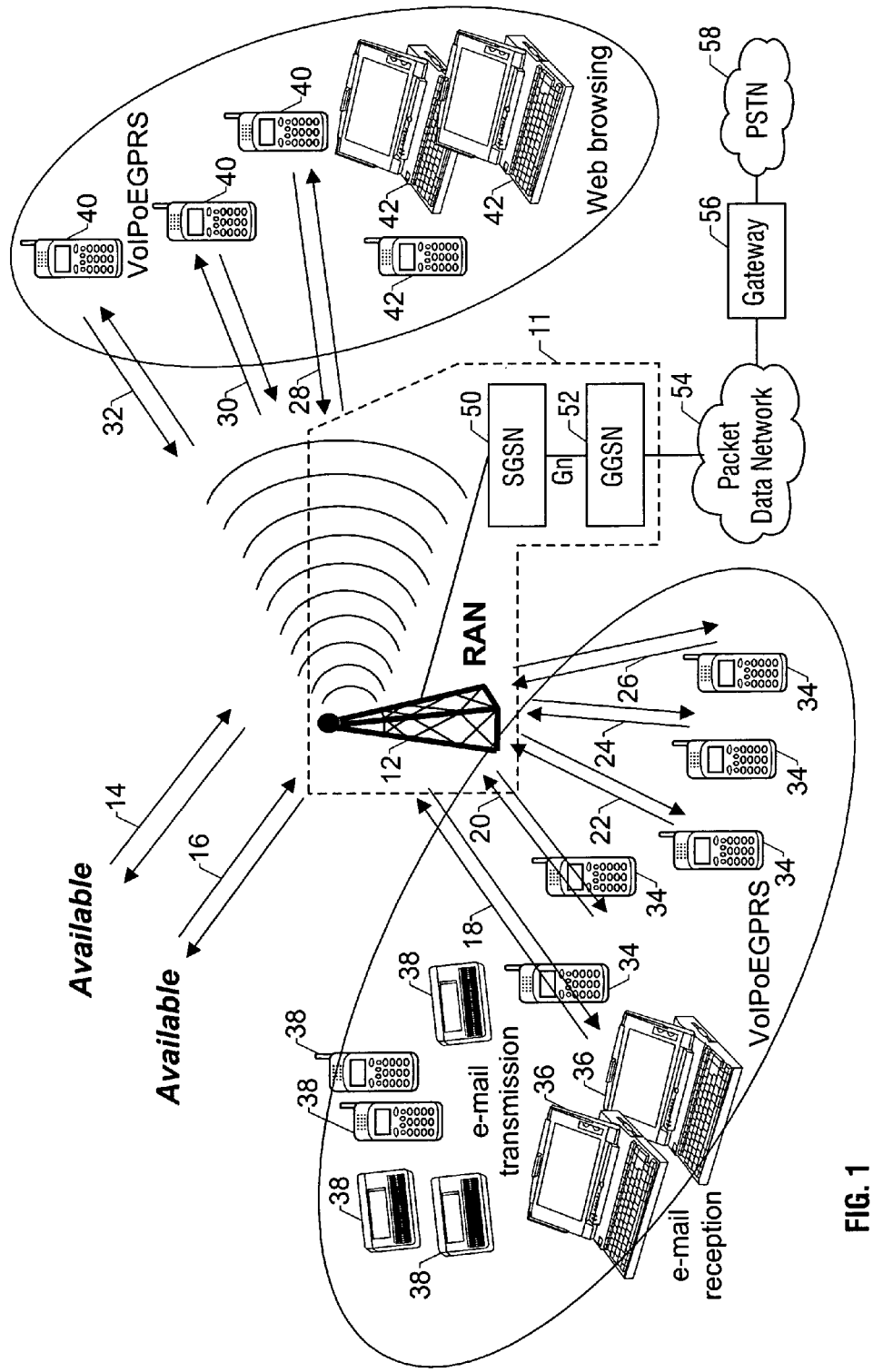
FIG. 1 is a block diagram of an embodiment of a mobile communications system.

Referring to FIG. 1, a mobile communication system 10, which may be a cellular or a personal communications services (PCS) system, includes a radio access network (RAN) 11 that includes base stations 12 having transceivers to transmit and receive radio frequency (RF) signals. The base stations 12 are coupled to a system controller 50, with each base station controlling communications with mobile stations in respective cells, cell sectors, or other cells segments. Examples of mobile stations that can communicate with the RAN 11 over RF channels include mobile telephones, mobile computers, personal digital assistants (PDAs), and other types of mobile stations.

In one embodiment, the radio access network 11 is an EGPRS (Enhanced GPRS or General Packet Radio Service) network that is able to support packet-switched data services. Alternatively, the radio access network may be a GPRS or an COMPACT network, or other types of wireless networks that are capable of supporting packet-switched data services, including a code-division multiple access (CDMA) network. The GPRS, EGPRS, and COMPACT protocols are set by the European Telecommunications Standards Institute (ETSI). As used here, reference to a "GPRS system" or "GPRS network," refers to any one of the GPRS, EGPRS, and COMPACT systems or networks.

In the GPRS network 11, the system controller 50 is a serving GPRS support node (SGSN), which is connected to the base station 12 over a Iu-ps interface. The SGSN 50 is also coupled to a gateway GPRS support node (GGSN) 52 over a Gn interface, which forms the gateway between the radio access network 11 and a packet-based data network 54, such as the Internet. Various network devices (not shown), such as a network telephone, a computer system, an Internet appliance, and so forth, are coupled to the packet data network 54. Some of the network devices are capable in participating in a real-time, interactive call session (e.g., a voice session, video conferencing session) with a mobile station through the radio access network 11. In addition, the packet data network 54 may be coupled through a gateway system 56 to a public switched telephone network (PSTN) 58, which is coupled to wireline telephones. Each mobile station is also capable of participating in a voice call session with the wireline telephone through the radio access network 11, packet data network 54, gateway system 56, and PSTN 58.

A "real-time, interactive" communications session refers to an exchange of data, such as audio and/or video data, on a substantially real-time basis between two terminals. A session is substantially real-time if interaction is occurring between two endpoints or parties, with a communication from one end point followed relatively quickly by a response or another communication from the other endpoint, typically within seconds, for example. Any substantial delay in the transmission of frames or packets carrying information associated with real-time, interactive communications may result in perceived degradation of the quality of the communications or in the reliability of the communications.

One type of packet-switched communications includes communications according to the Internet Protocol (IP). One version of IP is described in Request for Comments (RFC) 791, entitled "Internet Protocol," dated September 1981; and another version of IP is described in RFC 2460, entitled "Internet Protocol, Version 6 (IP v6 Specification)", dated December 1998. Packet-switched networks such as IP networks communicate with packets, datagrams, or other units of data over networks. Unlike circuit-switched networks, which provide a dedicated end-to-end connection or physical path for the duration of a communications session, a packet-switched network is based on a connectionless, internetwork layer. Routing of packets is based on destination addresses carried in the packets. The packets may be transmitted along different paths, and thus, may arrive at a destination in an order that is different than the transmission order. The destination terminal reassembles the received packets.

As shown in FIG. 1, mobile stations 34 and 40 are performing voice communications. In the example, the voice communications is referred to as VoIPoEGPRS (voice over IP over EGPRS), which refers to voice carried in IP packets that are in turn carried in EGPRS frames between the mobile stations and the radio access network 11. Instead of voice, the mobile stations 34 and 40 are also capable of communicating other types of real-time, interactive data, such as video data, multimedia data, and so forth. The mobile stations 34 and 40 can be half-rate or full-rate mobile stations.

The mobile stations 34 and 40 associated with voice or other real-time, interactive users, communicate with the radio access network 11 over wireless channels 18, 20, 22, 24, 26, 28, 30, and 32. The other mobile stations in the illustrated example include mobile stations 36 that are receiving electronic mail, mobile stations 38 that are transmitting electronic mail, and mobile stations 42 that are performing web browsing communications. Channels 14 and 16 are indicated as being available for other users.

As used here, a "channel portion" or "wireless channel portion" refers to a time slot of a frame transmitted on a given channel having a predetermined frequency. In a TDMA system such as an EGPRS system, each frame is divided into multiple time slots (e.g., 8 in the EGPRS system). For full-rate users, each time slot is allocated to carry bearer traffic of a mobile station. For half-rate users, each time slot is allocated to carry bearer traffic of two mobile stations. In other embodiments, the channel portion can be a portion of another type of channel, such as a channel in a code-divisional multiple access (CDMA) system.

To enhance the bandwidth for communications with the various mobile stations in the radio access network 11, multiplexing of traffic is performed when the mobile stations 34 and 40 (associated with voice or other real-time, interactive data users) are in discontinuous transmission (DTX) mode and thus not transmitting traffic. When that occurs, the radio access network 11 allocates the channel portion that is used by the voice user mobile station (currently in DTX mode) to another mobile station, such as one of mobile stations 36, 38, and 42 (which are communicating packet traffic) or to another mobile station that is communicating real-time, interactive data or streaming data.

On the downlink path, multiplexing of plural mobile stations, even if one is a voice user, is relatively simple to implement since the base station is aware of the traffic that needs to be transmitted downlink. However, in the uplink path, to provide adequate performance, a mechanism in accordance with some embodiments is provided to enable the voice user mobile station to request the channel portion that has been relinquished to another mobile station while the voice user mobile station is in DTX mode. The time between the request and the re-allocation of the channel portion is relatively small to ensure that voice traffic is not substantially delayed. The mechanism to enable the request and assignment of a channel portion for a mobile station exiting DTX mode includes a Real-Time Fast Access Associated Control Channel (RTFACCH), as further described below.

Thus, using the RTFACCH mechanism, an on-demand feature is provided to the voice user mobile station for requesting re-allocation of a channel portion (e.g., time slot) that has been allocated to another mobile station during DTX mode of the voice user mobile station. The request for re-allocation can be transmitted in any frame (with certain exceptions) after the voice user mobile station detects that it has exited DTX mode. Thus, the voice user mobile station does not need to wait for a pre-assigned frame or block before it can send some indication that it has exited DTX mode and is ready to start communicating traffic again. Typically, allocation of blocks for communication of traffic is performed using either USF (Uplink State Flag), which is transmitted on the downlink path, or in an RRBP (Relative Reserved Block Period) field, also transmitted on the downlink path. In fact, the voice user mobile station can transmit the request for re-allocation of the time slot during a period in which the other mobile station is transmitting traffic. As a result, mechanisms according to some embodiments are provided to detect the request despite the collision with traffic from the other mobile station on the same time slot (or channel portion).

In one embodiment, the radio access bearers of the GPRS network 11 include four different traffic classes (e.g., quality of service or QoS classes), including conversational traffic class, streaming traffic class, interactive traffic class, and background traffic class. The main factor that distinguishes these traffic classes from each other is how sensitive to delay they are. For example, the conversational traffic class includes traffic that is the most sensitive to delay, while the background traffic class includes traffic that is least sensitive to delay. Conversational and streaming traffic classes are primarily intended to be used for real-time traffic flows. The conversational traffic class includes real-time, interactive traffic, such as Internet telephony, while the streaming traffic class includes real-time traffic, such as transmissions of audio, video, or multimedia files that are being downloaded from a website to a terminal. Interactive and background traffic classes are primarily intended for use with non-real-time traffic flows, and include traffic flows associated with electronic mail, web browsing, file transfers, and so forth.

In the example of FIG. 1, mobile stations 34 and 40 are communicating traffic that are in the conversational traffic class, while mobile stations 36, 38, and 42 are communicating traffic that are in the interactive or background traffic class.

Figure 2:
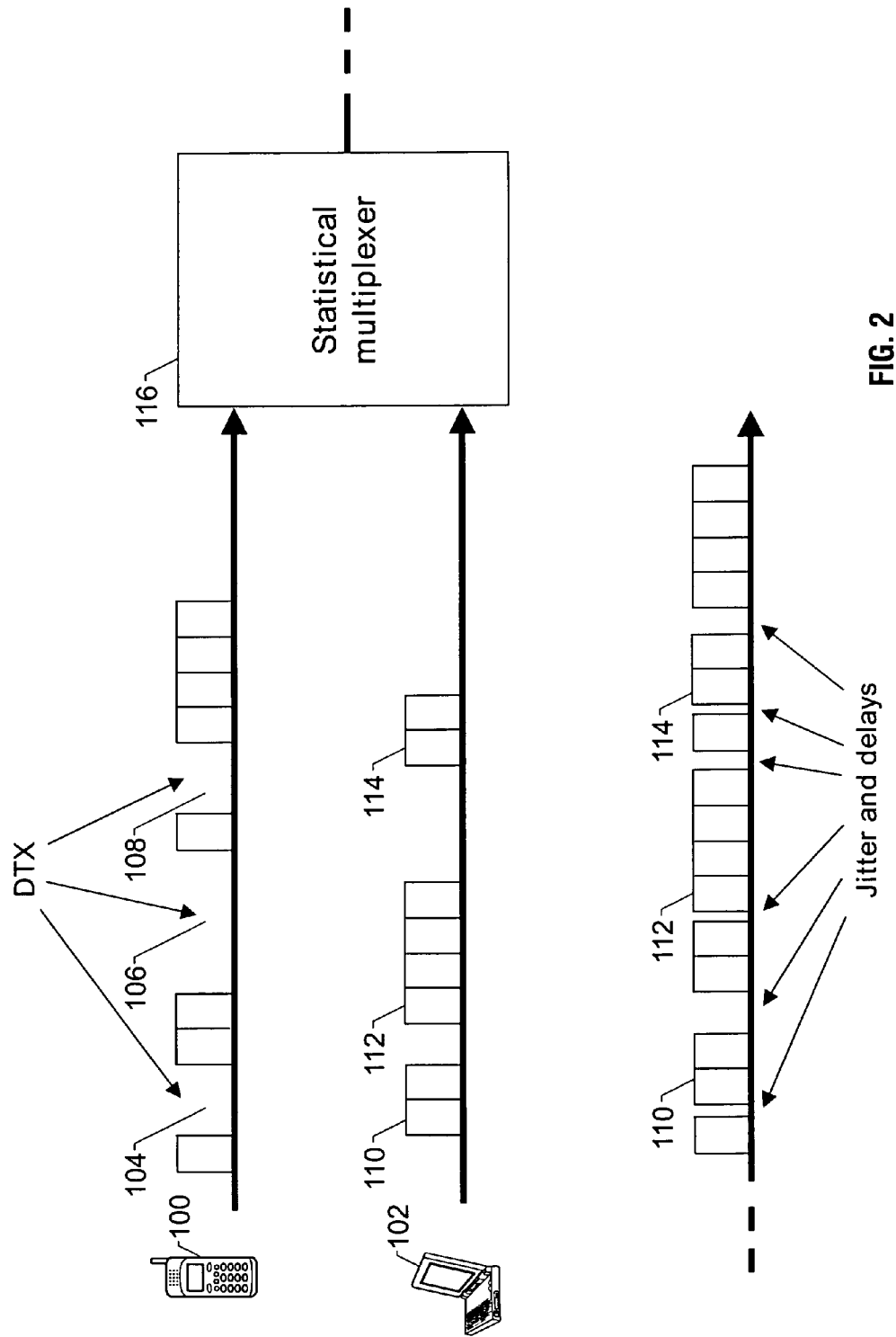
FIG. 2 illustrates multiplexing of traffic transmitted by first and second mobile stations, in accordance with an embodiment.

Referring to FIG. 2, multiplexing of traffic data from two mobile stations 100 and 102 on the same channel portion is illustrated. In one example, the mobile station 100 is communicating conversational class traffic, while the mobile station 102 is communicating interactive or background class traffic. However, in other examples, the mobile stations 100 and 102 may communicate other types of traffic.

As shown in FIG. 2, the mobile station 100 is communicating voice data with periods of silence (104, 106, and 108) corresponding to DTX mode of the mobile station 100 during which the user of the mobile station 100 is not speaking. During the silent periods 104, 106, and 108, data (represented as 110, 112, and 114) from mobile station 102 may be multiplexed onto the channel portion by a statistical multiplexer 116 that is part of the radio access network 11. The combined flow of the multiplexed traffic from the mobile stations 100 and 102 are outputted by the statistical multiplexer 116.

As noted above, in an EGPRS system, each channel portion that is used to carry traffic from a mobile station includes one of eight time slots in a frame. In the case of the full-rate voice user (or other conversational traffic class user), the time slot is a dedicated time slot that is typically not shared with other mobile stations. This is because conversational traffic class users are more sensitive to delays. For half-rate users, each time slot is allocated to two mobile stations, but again, sharing is typically not performed during the allocated portions of the time slot for each mobile station. However, a substantial portion of the time slot allocated to a conversational class traffic mobile station is not used during DTX mode. To take advantage of this unused bandwidth, traffic from other mobile stations, such as the mobile station 102, can be multiplexed into the silent periods 104, 106, and 108. For optimal performance, the traffic that is multiplexed into the DTX periods includes traffic that is not sensitive to delays, such as traffic in the background or interactive traffic class. However, if delays associated with the multiplexing are not too excessive, multiplexing of voice traffic data between two conversational traffic class users may also be performed, in some embodiments.

Figure 3:
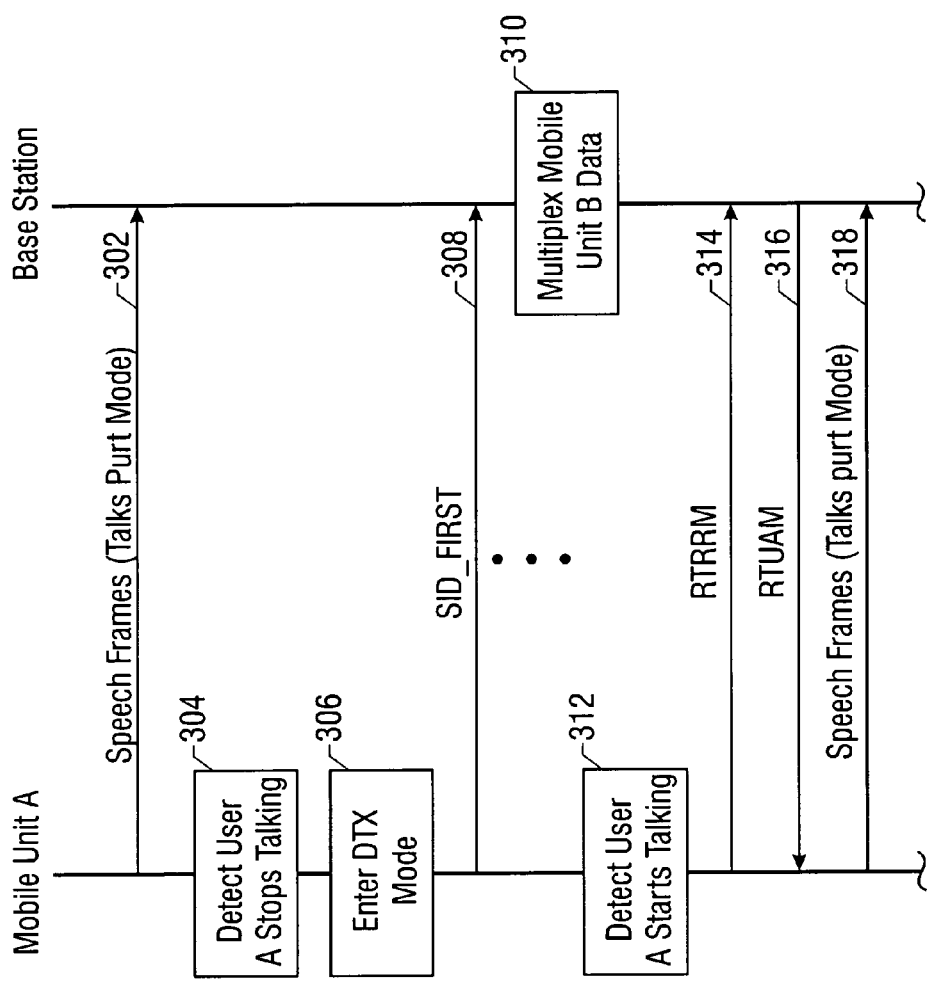
FIG. 3 is a message flow diagram of messages exchanged between, and actions performed by, a mobile station and a base station, in accordance with one embodiment.

Referring to FIG. 3, the process by which multiplexing of traffic from two mobile stations is enabled for a channel portion (referred to as "channel portion Y") in the uplink path (from the mobile station to the base station 12) and subsequent allocation of the channel portion back to the mobile station is illustrated. The mobile station ("mobile station A") sends speech frames (at 302) associated with a user ("user A") to the base station 12 on channel portion Y. In one embodiment, the communication of speech frames occurs during talkspurt mode. When the mobile station detects (at 304) that user A has stopped talking, the mobile station enters (at 306) DTX mode. When it enters DTX mode, the mobile station sends (at 308) a message indicating that DTX mode is starting or has started. In one embodiment, the message is a SID_FIRST frame, which is a marker to define the end of speech and the start of DTX mode. When the base station 12 receives the SID_FIRST frame, the base station 12 assigns (at 310)

channel portion Y to another mobile station ("mobile station B"). At this point, mobile station A is silent while mobile station B is transmitting on the uplink channel portion Y.

During DTX mode, mobile station A keeps its uplink TFI (temporary flow identifier) of a THF (temporary block flow). Normally, the TFI is used to identify one of multiple users on the same channel portion (for interactive or background class traffic, for example). Under EGPRS, the TFI is a 5-bit value, thus enabling up to 32 users on the same channel portion. Although mobile station A maintains its TFI value, radio resources of channel portion Y can be allocated to another mobile station. Also, the packet timing advance control channel (PTCCH) that is assigned to mobile station A can be relinquished to the other user.

However, although radio resources have generally been relinquished to mobile station B during DTX mode of mobile station A, control messages for maintenance purposes are still needed for mobile station A. For that reason, such control messages are communicated at set periods in the uplink path. The control messages include the SID_UPDATE message, which is used to communicate comfort noise parameters. Also, during the set periods, mobile station A can transmit PTCCH (packet timing advance control channel) to maintain time alignment; PACCH (packet associated control channel) to transmit control messages such as a channel quality message that includes parameters for link adaptation; RTCP (Real-Time Protocol Control Protocol) messages to provide feedback on the quality of real-time data communicated in the downlink path; and RSVP (Resource ReSerVation Protocol) Time Values objects to refresh the QoS path in the network. RTP is described in RFC 1889, entitled "RTP: A Transport Protocol for Real-Time Applications," dated January 1996; and RSVP is described in RFC 2205, entitled "Resource ReSerVation Protocol: Version 1 Functional Specification," dated September 1997.

At a later point in time, mobile station A detects (at 312) that user A has started talking again. As a result, mobile station A sends (at 314) an indication to the base station 12 that mobile station A again needs channel portion Y. In one embodiment, the message is in the form of an RTFACCH resource request message (RTRRM) sent by mobile station A to the base station 12. RTFACCH can also be used to carry an uplink assignment message (RTUAM), which is transmitted by the base station 12 (at 316) in response to RTRRM to assign uplink radio resources to mobile station A. Upon receipt of the RTUAM, mobile station A enters into talkspurt mode and again transmits (at 318) speech frames on channel portion Y.

In one embodiment, a speech traffic frame (or another type of real-time, interactive data frame) of a full-rate mobile station is interleaved over bursts in eight frames (or eight bursts). However, a speech traffic frame of a half-rate mobile station is interleaved over four bursts.

Figure 4A:
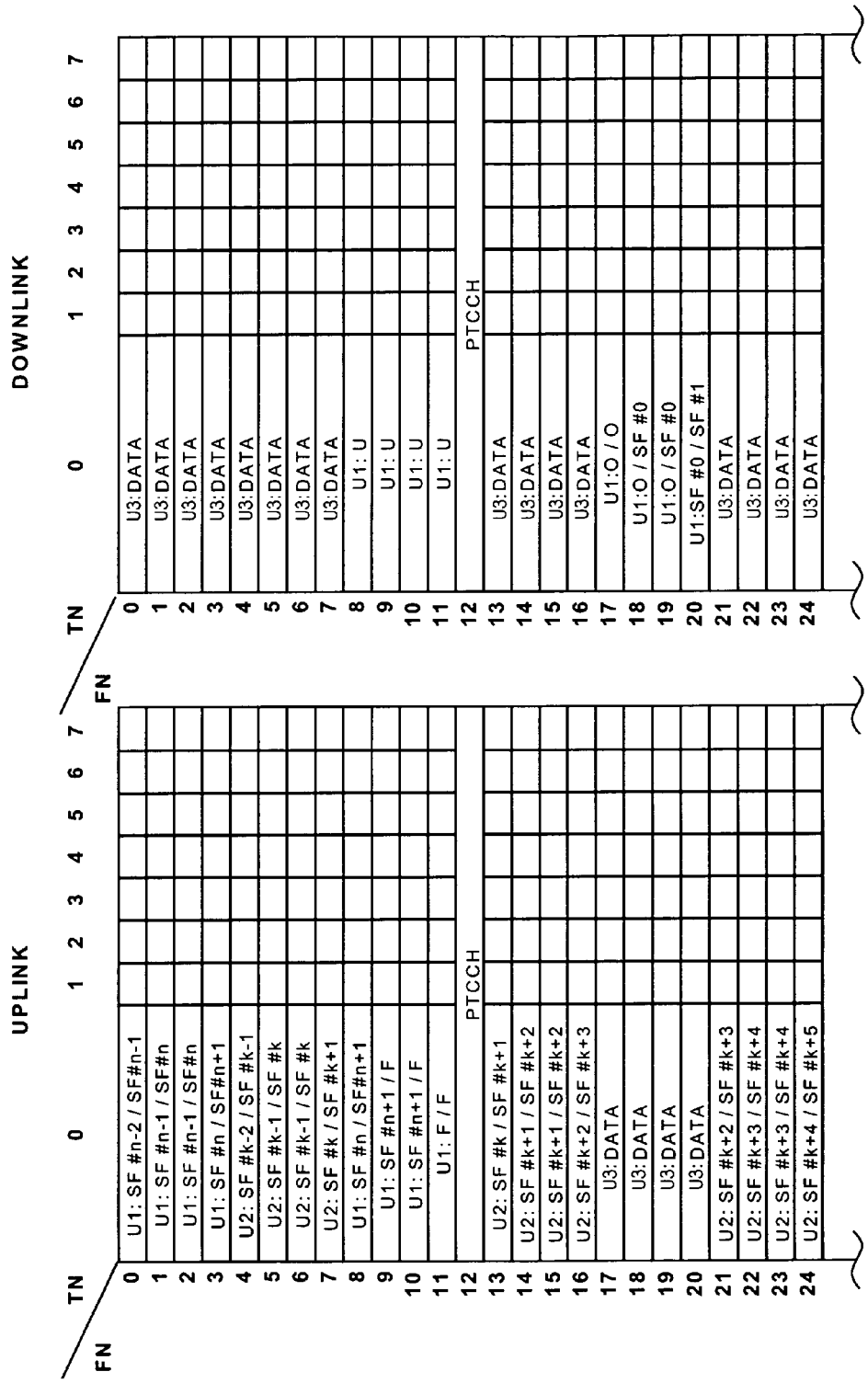

Referring to FIGS. 4A-4B, according to one embodiment, the interleaving scheme for half-rate mobile stations (mobile station A and mobile station B) are illustrated. Mobile station A is referred to as mobile station U1 in FIGS. 4A-4B, while mobile station B is referred to as mobile station U2 in FIGS. 4A-4B. Also, the statistical multiplexing of traffic from another mobile station (which can be a full-rate mobile station referred to as mobile station C or mobile station U3 in FIGS. 4A-4B) during DTX of one of the mobile stations A and B is also illustrated. In one embodiment, a multiframe 700 in the uplink path and a multiframe 702 in the downlink path carry control and traffic frames. Each of the multiframes 700 and 702 includes 52 frames FN0-FN51. Each frame has eight time slots TN0-7. In the example shown, time slot TN0 is assigned to carry speech associated with half-rate mobile stations A and B. For purposes of illustration, each mobile station transmits a stream of speech traffic frames SF #i, i=0 to M (that is, SF #0, . . . , SF #M). In accordance with some embodiments of the invention, the interleaving scheme for a speech traffic frame (SF #i) uses a first interleaving algorithm for a first set of traffic frames and a second interleaving algorithm for a second set of traffic frames. The first set of traffic frames can be the odd set (that is, i=1, 3, 5, etc.), while the second set of traffic frames can be the even set (that is, i=0, 2, 4, etc.).

The first and second interleaving algorithms are designed to enable statistical multiplexing of traffic from a half-rate mobile station and traffic from another mobile station (which can be a full-rate mobile station that is transmitting best effort data such as interactive or background class data). The best effort data is typically interleaved over four bursts, while speech data for a half-rate mobile station is interleaved over four bursts of two blocks.

Each multiframe 700 or 702 includes plural blocks, with each block containing four frames. FIGS. 4A-4B show the interleaving scheme used for half-rate mobile stations A and B. In the illustrated example, in the uplink path, speech frame SF#n (with n being an even number) for mobile station A is interleaved over four bursts in frames FN1-3 in block B0 (including frames FN0-3) and frame FN8 in block B2 (including frames FN8-11). The next speech frame SF#n+1 (n+1 being an odd number) is interleaved over four bursts in frame FN3 in block B0 and frames FN8-10 in block B2.

Similarly, speech frame SF#k (with k being an odd number) for mobile station B is interleaved over four bursts in frames FN5-7 in block B1 (including frames FN4-7) and frame FN13 in block B3 (including frames FN13-16). Speech frame SF#k+1 (with k+1 being an odd number) is interleaved over four bursts in frame FN7 in block B1 and frames FN13-15 in block B3.

Thus, generally, when a speech frame starts on block B(x), the $i^{th}$ speech frame is interleaved over B(x+2k) and B(x+2k+2), where k is equal to INT(i/2). The operation INT(y) involves taking the integer value of y. If the value of i is even, then speech frame SF#i is interleaved over bursts in the last three frames in block B(x+2k) and the first frame in block B(x+2k+2). If the value of i is odd, then speech frame SF#i is interleaved over bursts in the last frame of block B(x+2k) and the first three frames in block B(x+2k+2).

The interleaving scheme discussed above for half-rate mobile stations enables statistical multiplexing in a channel portion (in this example time slot TN0 of each frame) of traffic from a half-rate mobile station and traffic from another mobile station. This is accomplished by ensuring that each SID_FIRST frame (which is interleaved over four bursts) is contained in the same block that carries the last speech traffic frame.

In the example of FIGS. 4A-4B, the last speech frame for mobile station A (before DTX) is SF#n+1, which is interleaved over blocks B0 and B2. The SID_FIRST frame (represented as "F" in FIGS. 4A-4B) is also carried in block B2, and is interleaved over bursts in the last three frames FN9-11 of block B2. Thus, mobile station A stops traffic transmission after block B2, while mobile station B continues to transmit speech traffic. Frame FN12 is used to carry the PTCCH (Packet Timing Advanced Control Channel) between blocks B3 and B4.

Once mobile station A has entered into DTX mode, time slot TN0 in the subsequent block that would have been allocated to mobile station A (block B5) is allocated to another mobile station C to carry traffic of mobile station C. The frames carrying traffic of mobile station C are marked with "U3: DATA". The next block B6 is used to carry the speech traffic for mobile station B.

After the idle frame FN25, frames FN26-29 (block B7) are used to carry traffic transmitted by mobile station C. Next, in frames FN30-33 (block B8), the speech traffic for mobile station B is communicated.

In accordance with some embodiments, even though mobile station A is in DTX mode, it continues to transmit SID_UPDATE messages to convey comfort noise parameters. The SID_UPDATE message is interleaved over bursts in frame numbers FN34-37 (block B9). In one embodiment, the SID_UPDATE message is communicated by the mobile station in DTX mode every (N+1)th radio block, where N is set to some arbitrary value, e.g., N greater than or equal to 1. In the example illustrated in FIGS. 4A-4B, N is equal to 2. Also, at longer intervals, the same (N+1)th radio block may also be used for the following purposes: transmitting PTCCH information periodically; transmitting control messaging through PACCH; transmitting RTCP packets through PDTCH; and transmitting RSVP Time Values objects through PDTCH.

After block B9, the next frame FN38 carries PTCCH information, followed by traffic from the mobile station B in frames FN39-42 (block B10). The next block B11 is used to carry traffic for mobile station C. Also, at this time, mobile station A has detected user voice traffic again and wishes to begin re-transmitting. To do so, mobile station A transmits RTRRM (represented by R) in frame FN45 (which is also carrying traffic from the mobile station C).

Generally, according to one embodiment, RTRRM can be transmitted on any frame number of a multiframe except the following: FN mod 52=12 (which carries PTCCH), 25 (which is idle), 38 (which carries PTCCH), or 51 (which is idle).

In response to RTRRM in frame FN41, the base station transmits RTUAM (represented as A) in frame FN46 of multiframe 702 (on the downlink). With RTUAM, the base station allocates time slot TN0 in the multiframe 700 back to mobile station A. After being allocated back time slot TN0, mobile station A transmits the ONSET frame (not shown in FIGS. 4A-4B) to indicate that the beginning of a speech frame is about to begin and to re-start traffic transmission.

On the downlink path, statistical multiplexing of traffic destined for two different mobile stations can also be performed. However, since the base station is aware of when it has entered DTX mode with one mobile station, it can easily multiplex the traffic from another mobile station during its silence period with the first mobile station. The RTFACCH mechanism discussed for the uplink path is not required to perform statistical multiplexing on the downlink path. Thus, while mobile stations A and B are transmitting speech frames on the uplink path in bursts in frames FN0-7 (blocks B0 and B1), the base station is not transmitting data on the downlink path, and thus the base station enters DTX mode on the downlink path to mobile stations A and B. During this downlink DTX period, frames FN0-1 can be used to communicate traffic to another mobile station (e.g., mobile station C or U3). Although the example shows traffic of mobile station C being carried during DTX periods of the base station on the downlink path to mobile stations A and B, it should be noted that the traffic can be from another mobile station.

SID_UPDATE frames are communicated on the downlink path from the base station to mobile station A on frames FN8-11 (block B3) of the multiframe 702. Next, the base station transmits downlink traffic to mobile station C in frames FN13-16. After the base station allocates time slot TN0 back to mobile station A, the base station transmits the ONSET frame in frames FN17-19 in block B5, along with a portion of speech frame 0 (SF#0) in frames FN18-20. Pursuant to the interleaving scheme discussed above, the remainder of speech frame SF#0 to mobile station A is communicated in block B7 (in frame FN26). Since the downlink path to mobile station B is still in DTX mode, that portion of time slot TN0 can be used to carry traffic to mobile station C. For mobile station A, subsequent speech frames SF#1, SF#2, and SF#3 are interleaved over bursts in frames of blocks B7 and B9. In addition, SF#3 is the last traffic frame, so a SID_FIRST frame is also interleaved over bursts in block B9 to indicate the start of DTX mode.

Next, blocks B10-B12, are used to carry traffic targeted for mobile station C since the downlink paths from the base station to both mobile stations A and B are now silent. However, the base station also detects transmission of the RTRRM message in block B11 at this time (transmitted by mobile station A in frame FN45). In response to detection of RTRRM, the base station preempts the transmission of traffic for mobile station C in frame FN46 and transmits RTUAM instead.

FIGS. 4A-4B illustrate a first interleaving scheme for the SID_FIRST frame for when the last speech traffic frame is an odd burst (SF#n+1 in the example). The SID_FIRST frame is interleaved according to a different scheme when last speech traffic frame is an even frame, which is illustrated in FIGS. 5A-5B.

Figure 5A:
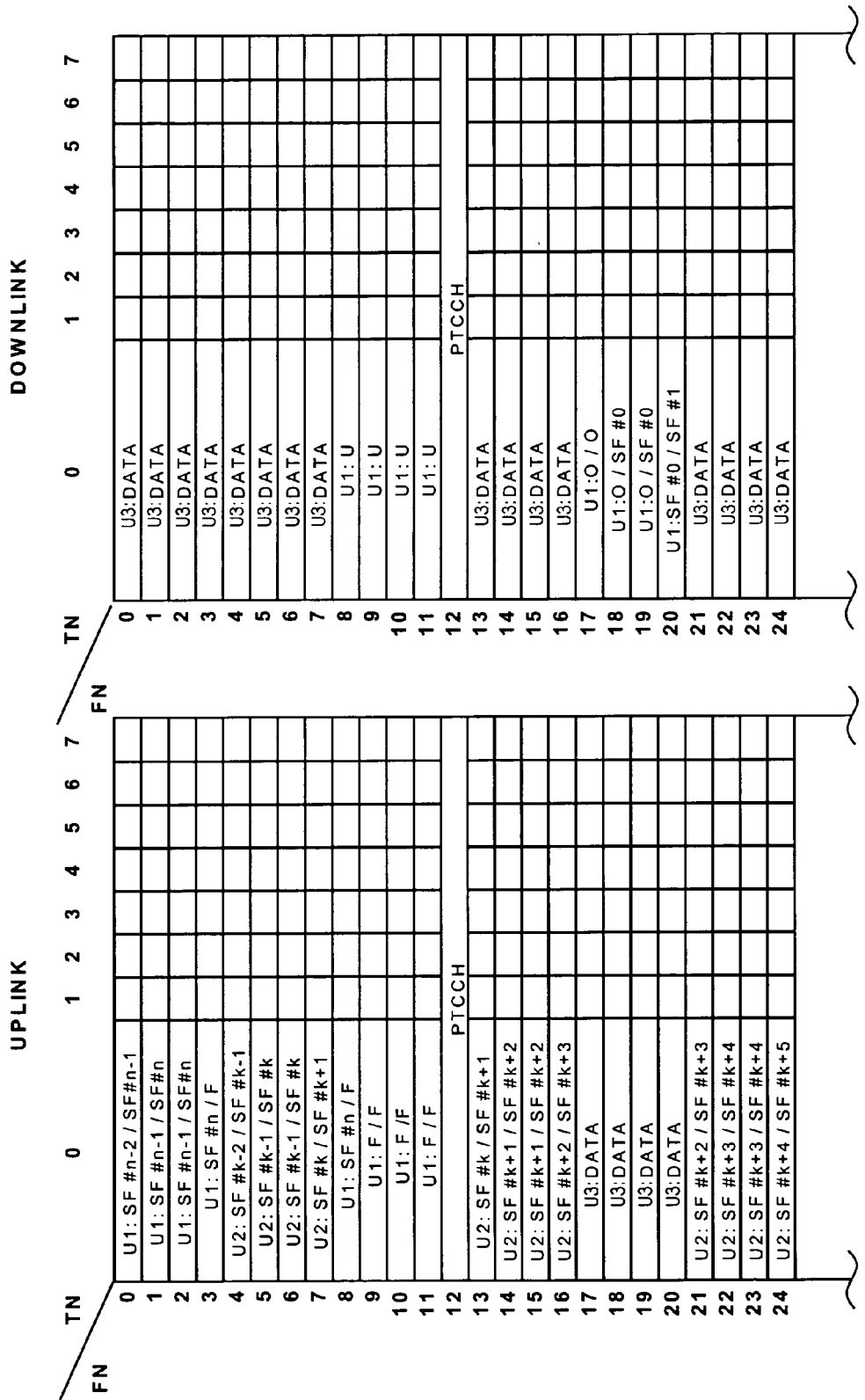

As shown in FIGS. 5A-5B, the last speech frame for mobile station A is SF#n (n being an even number), which is interleaved over frames FN1-3 in block B0 and FN8 in block B2. In this scenario, the SID_FIRST frame is interleaved over frame FN3 in block B0 and frames FN8-9 in block B2. Also, the SID_FIRST frame is repeated in frames FN10-11.

Thus, generally, the SID_FIRST frame has the following interleaving scheme. When the last speech frame interleaved is even (that is, i is even) and sent on block B(x), then SID_FIRST is interleaved over the last burst of block B(x) and the first two bursts of block B(x+2). Subsequently, the SID_FIRST frame is repeated in the last two frames of block B(x+2). When the last speech frame is odd, the SID_FIRST frame is interleaved over the last three bursts of block B(x).

The downlink multiframe 702 shown in FIGS. 5A-5B contains the same data as that in FIGS. 4A-4B.

Figure 6B:
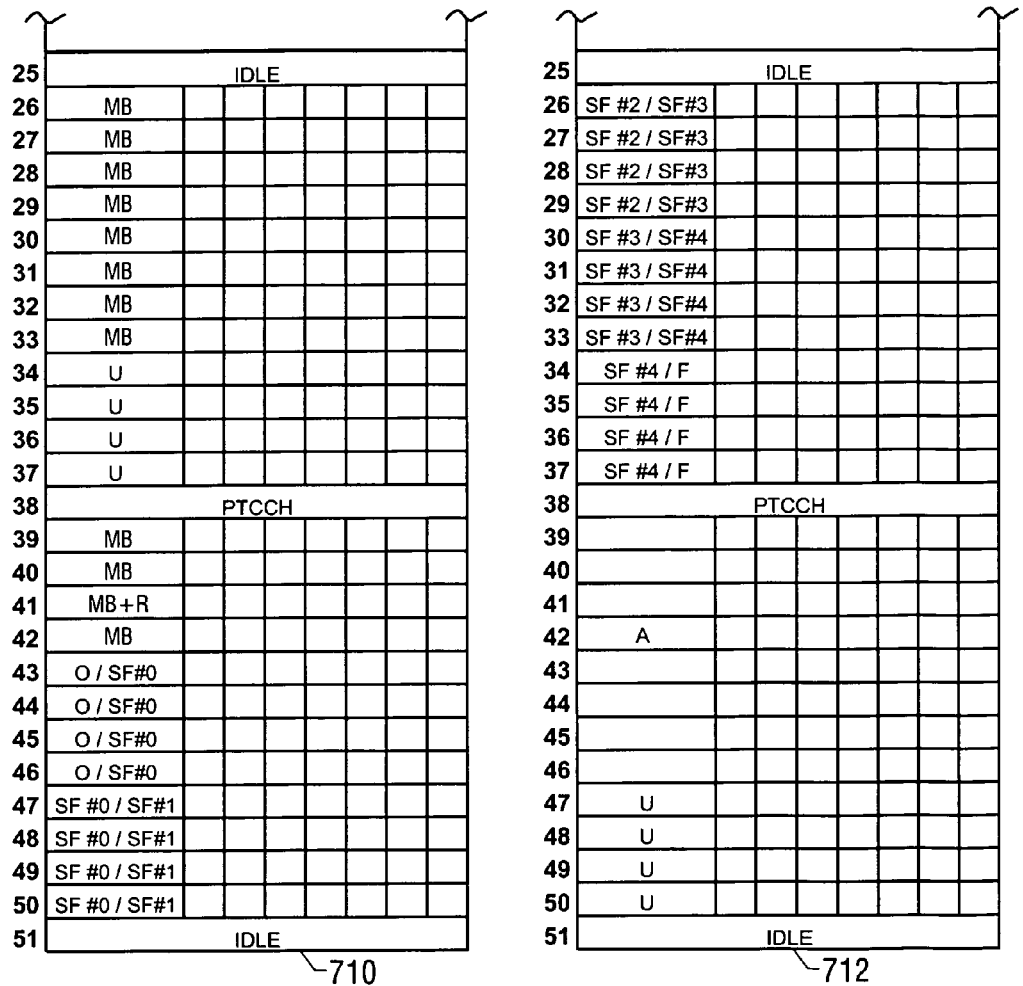

FIGS. 4A-4B and 5A-5B illustrate examples for half-rate mobile stations. The statistical multiplexing mechanism for a full-rate mobile station that enters DTX mode is described below in connection with FIGS. 6A-6B and 7A-7B. Referring to FIGS. 6A-6B, a multiframe 710 communicated in the uplink path and a multiframe 712 communicated in the downlink path are illustrated. The multiframes 710 and 712 each includes 52 frames FN0-FN51. According to one configuration, a speech frame (SF) of a full-rate mobile station is interleaved over eight bursts. In the example shown in FIGS. 6A-6B, time slot TN0 is assigned to carry speech associated with a first mobile station (mobile station A), which is a full-rate mobile station. Thus, as shown, speech frame 1 (SF#1) is interleaved over bursts in frames FN0-7 (blocks B0 and B1). The last half of speech frame 0 (SF#0) is interleaved over bursts in frames FN0-3. Speech frame 2 (SF#2) is interleaved over bursts in frames 4-11 (blocks B1 and B2). SF#2 is the end of speech stream from the first mobile station, so that SID_FIRST (F) frames are also interleaved over bursts in frames FN8-11 (block B3). Frame FN12 is used to carry the PTCCH (Packet Timing Advanced Control Channel).

Since the first mobile station (mobile station A) has entered into DTX mode, time slot TN0 in the subsequent frames of the multiframe can be allocated to a second mobile station (mobile station B), also a full-rate mobile station, to carry traffic transmitted by mobile station B. As shown, traffic associated with mobile station B is carried in frames FN13-20 (blocks B4 and B5). The frames carrying traffic of mobile station B are marked with "MB".

In accordance with some embodiments, even though the first mobile station is in DTX mode, it continues to transmit SID_UPDATE messages to convey comfort noise parameters. The SID_UPDATE message is interleaved over frame numbers FN21-24 (block B6). In one embodiment, the SID_UPDATE message is communicated by the mobile station in DTX mode every (N+1)th radio block, where N is set to some arbitrary value, e.g., N greater than or equal to 1. In the example illustrated in FIGS. 6A-6B, N is equal to two. Also, at longer intervals, the same (N+1)th radio block may also be used for the following purposes: transmitting PTCCH information periodically; transmitting control messaging through PACCH; transmitting RTCP packets through PDTCH; and transmitting RSVP Time Values objects through PDTCH.

After the idle frame FN25, frames FN26-33 (blocks B7 and B8) are used to carry traffic transmitted by mobile station B. Next, in frames FN34-37 (block B9), the SID_UPDATE frame is transmitted by the mobile station A. The next frame FN38 carries PTCCH information, followed by traffic from the mobile station B in frames FN39-42 (block B10). In addition, at this time, mobile station A has detected user voice traffic again and wishes to begin re-transmitting. To do so, mobile station A transmits RTRRM (represented by R) in frame FN41 (which is also carrying traffic from the mobile station B).

As in the case with half-rate mobile stations in the examples of FIGS. 4 and 5, RTRRM can be transmitted on any frame number of a multiframe except the following: FN mod 52=12 (which carries PTCCH), 25 (which is idle), 38 (which carries PTCCH), or 51 (which is idle).

In response to RTRRM in frame FN41, the base station transmits RTUAM (represented as A) in frame FN42 of multiframe 712 (on the downlink). With RTUAM, the base station has allocated time slot TN0 in the multiframe 710 back to mobile station A. After being allocated back time slot TN0, mobile station A transmits the ONSET frame in frames FN43-46 (block B11). Mobile station A also starts transmitting speech frame 0 (SF#0) after exiting DTX mode. SF#0 is interleaved over eight frames FN43-50 (blocks B11 and B12). Mobile station A continues to transmit further speech frames.

On the downlink path, statistical multiplexing of traffic destined for two different mobile stations can also be performed. However, since the base station is aware of when it has entered DTX mode with one mobile station, it can easily multiplex the traffic from another mobile station during its silence period with the first mobile station. The RTFACCH mechanism discussed for the uplink path is not required to perform statistical multiplexing on the downlink path. Thus, while mobile station A is transmitting speech frames on the uplink path in frames FN0-7 (blocks B0 and B1), the base station is not transmitting data on the downlink path, and thus the base station enters DTX mode on the downlink path to mobile station A. However, the same frames can be used to communicate traffic to another mobile station (e.g., mobile station B). SID_UPDATE frames are communicated on the downlink path from the base station to mobile station A on frames FN8-11 (block B3) of the multiframe 712. After the base station allocates time slot TN0 back to mobile station A, the base station transmits the ONSET frame in bursts FN13-16 (B4), along with speech frame 0 (SF#0). Further speech frames are communicated in subsequent frames of the multiframe 712, until the speech has stopped. At that point, in frames FN34-37 (block B9), the SID_FIRST frame is transmitted downlink in bursts frames FN34-37.

Next, the block (B10) starting at frame FN39 is used to carry traffic targeted for mobile station B since the downlink path from the base station to the first mobile station is now silent. However, the base station also detects transmission of the RTRRM message at this time (transmitted by the first mobile station in frame FN41). In response to detection of RTRRM, the base station preempts the transmission of traffic for mobile station B in frame FN42 and transmits RTUAM instead.

FIGS. 6A-6B illustrate the minimum delay between when an RTRRM message is transmitted by the mobile station A after the re-establishment of uplink speech transmission by the first mobile station. In the example of FIGS. 6A-6B, a one-frame delay is experienced between RTRRM and the start of speech transmission in frame FN43 in the uplink multiframe 710. Minimum delays between RTRRM and RTUAM were also illustrated in the examples of FIGS. 4 and 5 for half-rate mobile stations.

Figure 7A:
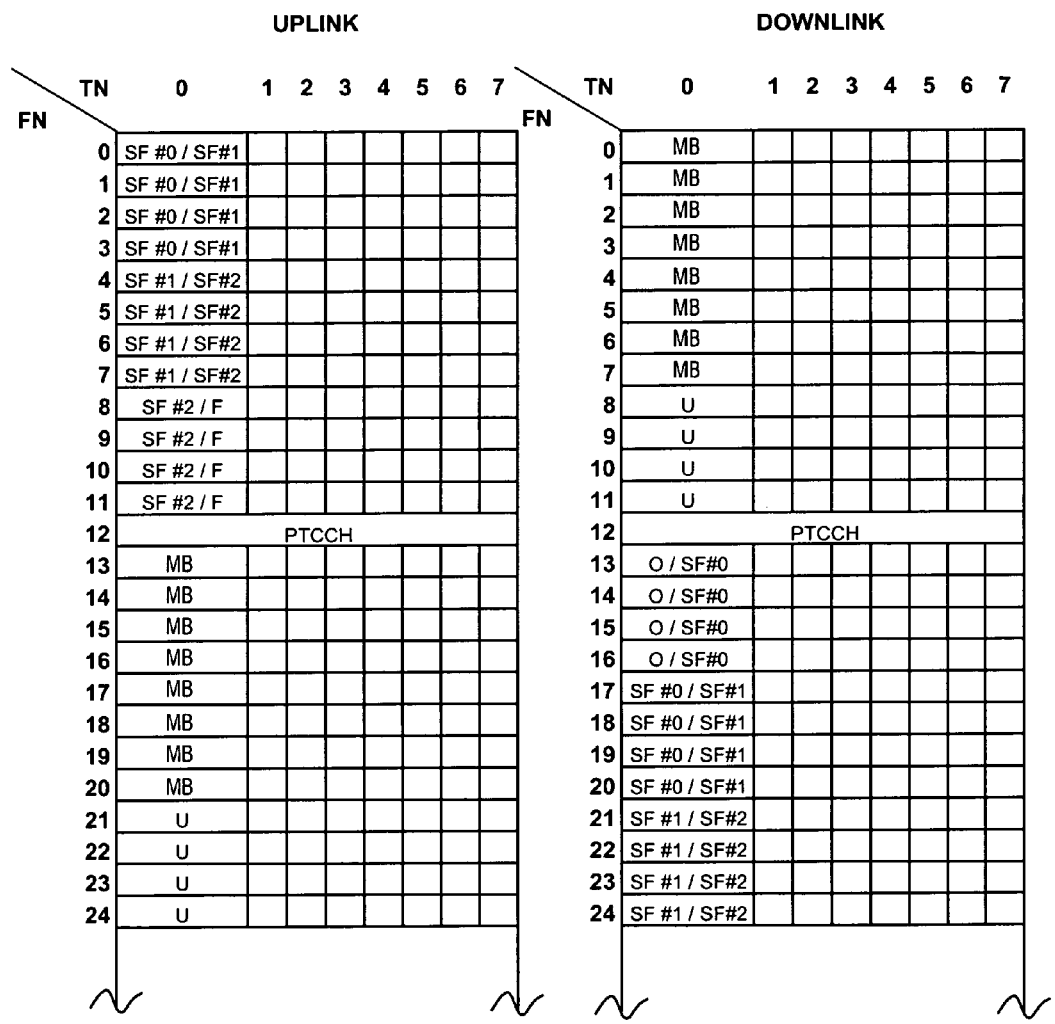

Referring to FIGS. 7A-7B, a maximum delay scenario for fill-rate mobile stations is illustrated. FIGS. 7A-7B show a multiframe 800 on the uplink path and a multiframe 802 on the downlink path. The difference between the examples of FIGS. 6A-6B and 7A-7B is that RTRRM is transmitted in frame FN42 in the multiframe 800 (instead of frame FN41 in the multiframe 710 of FIGS. 6A-6B). Frame FN42 is the last frame of block B9. As a result, the assignment message RTUAM is not communicated until the beginning of the next block (B10) in frame FN43. As a result, the next block B10 on the uplink path is not allocated to the first mobile station (so that traffic from mobile station B continues to be transmitted in the uplink multiframe 800). It is not until block B11 of the uplink multiframe 800 that mobile station A can resume transmission of traffic in time slot TN0.

Figure 8A:
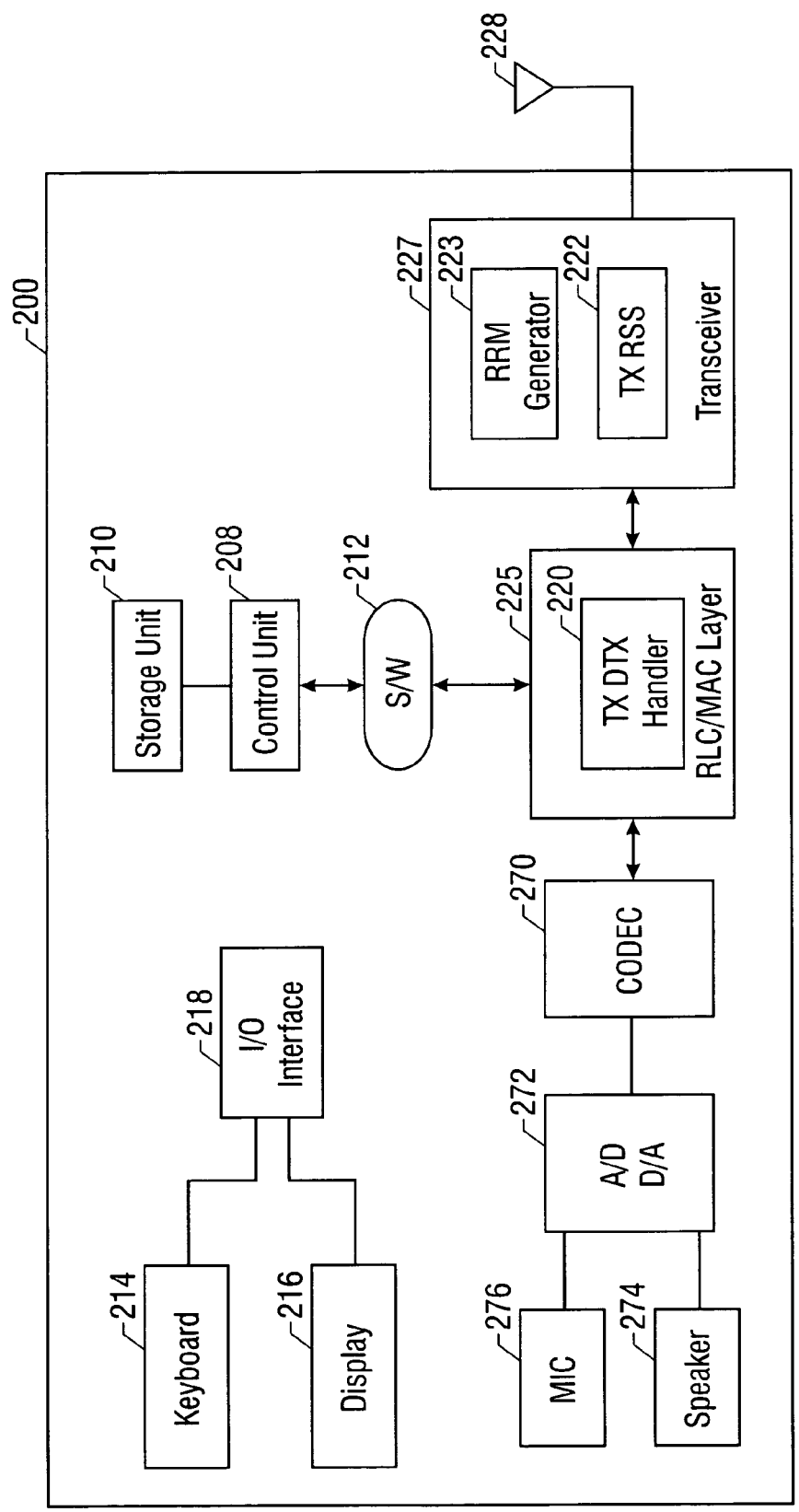
FIGS. 8A-8B are a block diagram of components of the communications system of FIG. 1.
Figure 8B:
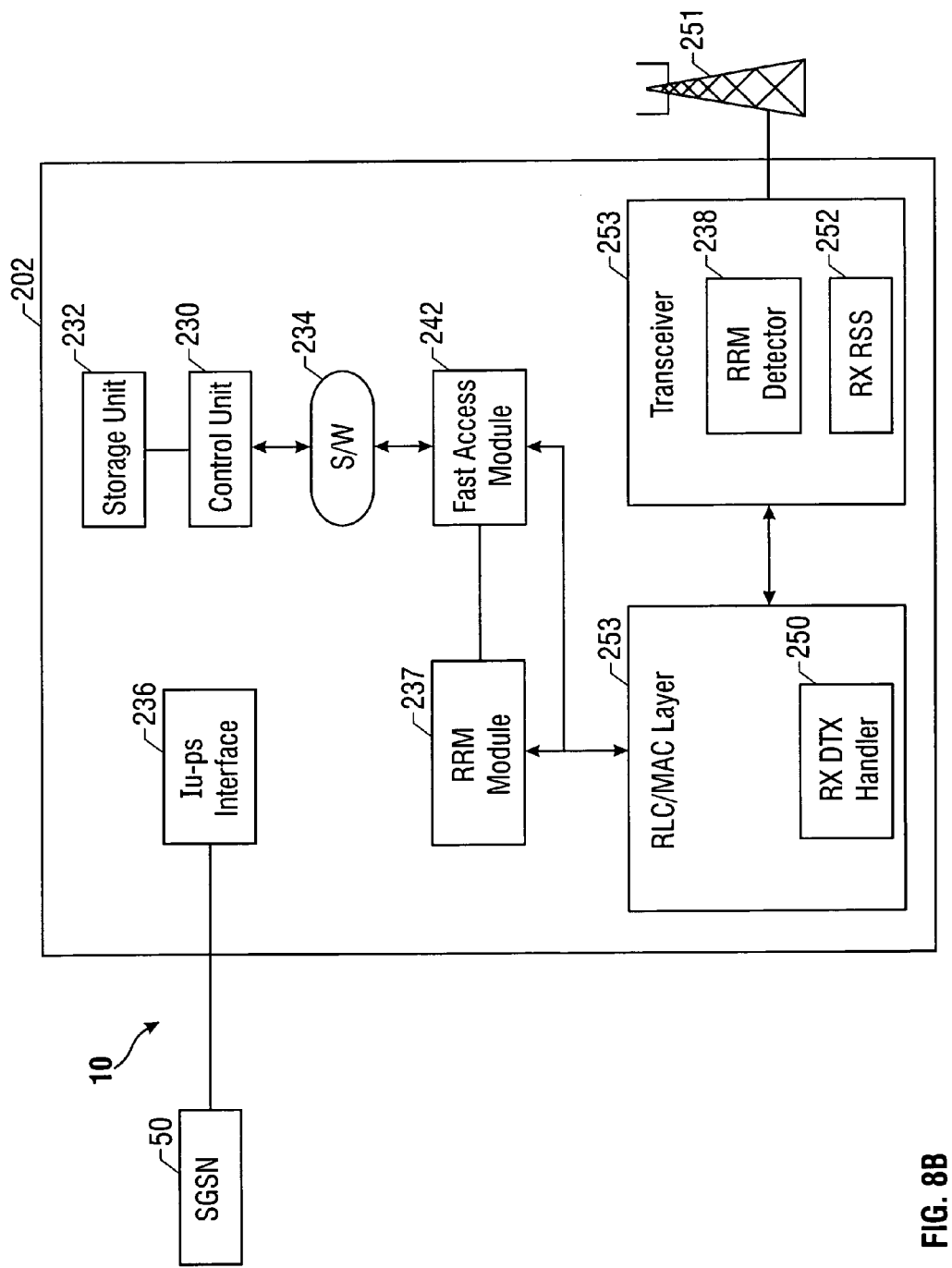

Referring to FIGS. 8A-8B, some of the components of the mobile communications system 10 of FIG. 1 are illustrated in greater detail. A mobile station 200 communicates over a wireless link with a base station 202, which has a Iu-ps interface 236 that is coupled to the SGSN 50. The mobile station 200 includes an RF transceiver 227 that is connected to an RF antenna 228. The mobile station 200 also includes an RLC/MAC (radio link control/medium access control) layer 225. The RLC module provides a radio-solution-dependent reliable link, and the MAC module controls the access signaling (request and grant) procedures for the radio channel.

The RLC/MAC layer 225 also includes a transmit DTX (TX DTX) handler 220 that passes traffic frames to a TX RSS (transmit radio subsystem) 222 in the transceiver 227. Each frame passed to the TX RSS 222 includes bit fields containing the information bits, the audio coder/decoder (CODEC) mode indication, and a TX_TYPE identifier to identify the content of the frame. The TX_TYPE identifier can specify that the frame contains speech; SID_FIRST to mark the end of speech; SID_UPDATE to provide comfort noise parameters; ONSET to indicate that the beginning of a speech frame is about to begin; NO DATA to indicate that the frame contains no useful data and should not be transmitted over the air interface; and other information. The transceiver 227 also includes an RRM generator 223 for generating RTRRM messages. As will be discussed further below, an RTRRM message is a coded version of the TFI associated with the mobile station. The RRM generator 223 performs the coding in accordance with some embodiments.

The TX DTX handler 220 includes a voice activity detector to assess whether input signals contain speech or not. If there is no speech, then the TX DTX handler 220 sends an indication to the TX RSS 222 to enter DTX mode by setting the flag TX_TYPE to the value corresponding to SID_FIRST. When the TX RSS 222 receives a SID_FIRST frame, radio transmission from the TX RSS 222 is cut off. The TX DTX handler 220 receives audio data from an audio CODEC 270, which is coupled to an analog-to-digital (A/D) and digital-to-analog (D/A) converter 272 that outputs audio data to a speaker 274 and receives input audio from a microphone 276.

During DTX mode, the TX RSS 222 is resumed at regular intervals for transmission of SID_UPDATE frames to communicate comfort noise parameters calculated in the TX DTX handler 220. The TX RSS 222 includes a channel encoder to encode information to be communicated over the air link.

Frames received over the air are passed by the transceiver 227 up through the RLC/MAC layer 225 and upper layers (not shown). Received control messages are processed by the upper layers or by one or more software routines 212. Received speech messages are passed to the audio CODEC 270 for output on the speaker 274.

The statistical multiplexer 116 (FIG. 2) can be implemented in one or more layers of the base station 202 (e.g., transceiver 253, RLC/MAC layer 255, and higher layers, as shown in FIG. 8B).

In one configuration, radio access bearer 0 (RAB0) is used, in which the RTP/UDP/IP (Real-Time Protocol/User Datagram Protocol/Internet Protocol) header of each speech frame is removed in the radio access network 11 on the downlink path before transmission to the mobile station. The RTP/UDP/IP header is then reconstructed by the mobile station. On the uplink path, the RTP/UDP/IP header is removed by the mobile station and then reconstructed in the radio access network 11. For the radio access bearer 1 and 2 (RAB1 and RAB2) configurations, the RTP/UDP/IP header (compressed or uncompressed) is communicated to/from by the mobile station and radio access network 11. To do so, appropriate RTP, UDP, and IP stacks (not shown) are provided in the mobile station.

The various software layers, routines or modules in the mobile station 200 are executable on a control unit 208, which is connected to a storage unit 210. The mobile station 200 also includes an input/output (I/O) interface 218, which is connected to a keyboard 214 and a display 216.

The base station 202 also includes a transceiver 253 that is coupled to an antenna tower 251 and an RLC/MAC layer 255. The transceiver 253 includes a receive radio subsystem (RX RSS) 252 for receiving frames over the air link. The RX RSS 252 is connected to a receive DTX (RX DTX) handler 250 in the RLC/MAC layer 255. The RX DTX handler 250 is responsible for the overall DTX operation on the receive side. The RX RSS 252 continuously passes received traffic frames to the RX DTX handler 250. A flag RX_TYPE is set by the RX RSS 252 to indicate how the frame is to be handled by the RX DTX handler 250. For example, the RX_TYPE flag can indicate that the received frame includes speech or that the received frame includes a SID_FIRST, SID_UPDATE, or ONSET message.

The base station 202 includes a radio resource management (RRM) module 237 that receives indications (SID_FIRST) that radio resources are available for statistical multiplexing because a mobile station has gone idle (e.g., DTX mode). When that occurs, the radio resources, in the form of a channel portion, are allocated to another mobile station for the uplink.

The base station 202 also includes a fast access module 242 to control the RTFACCH operation. The fast access module 242 detects for receipt of the RTRRM message, and in response to the RTRRM message, the fast access module 242 sends an RTUAM message to the mobile station 200 to re-assign a channel portion to the mobile station 200. The fast access module cooperates with one or more base station routines 234 to determine allocation of the channel portion. The fast access module 242 and the software routines 234 are executable on a control unit 230, which is coupled to a storage unit 234.

In accordance with some embodiments, decoding for presence of RTRRM on the channel portion is performed by an RTRRM detector 238 in the transceiver 253. RTRRM is transmitted by the mobile station 200 during transmission of actual data traffic by another mobile station on the same channel portion. The RTRRM detector 238 is discussed in greater detail below in connection with FIG. 11.

Figure 9:
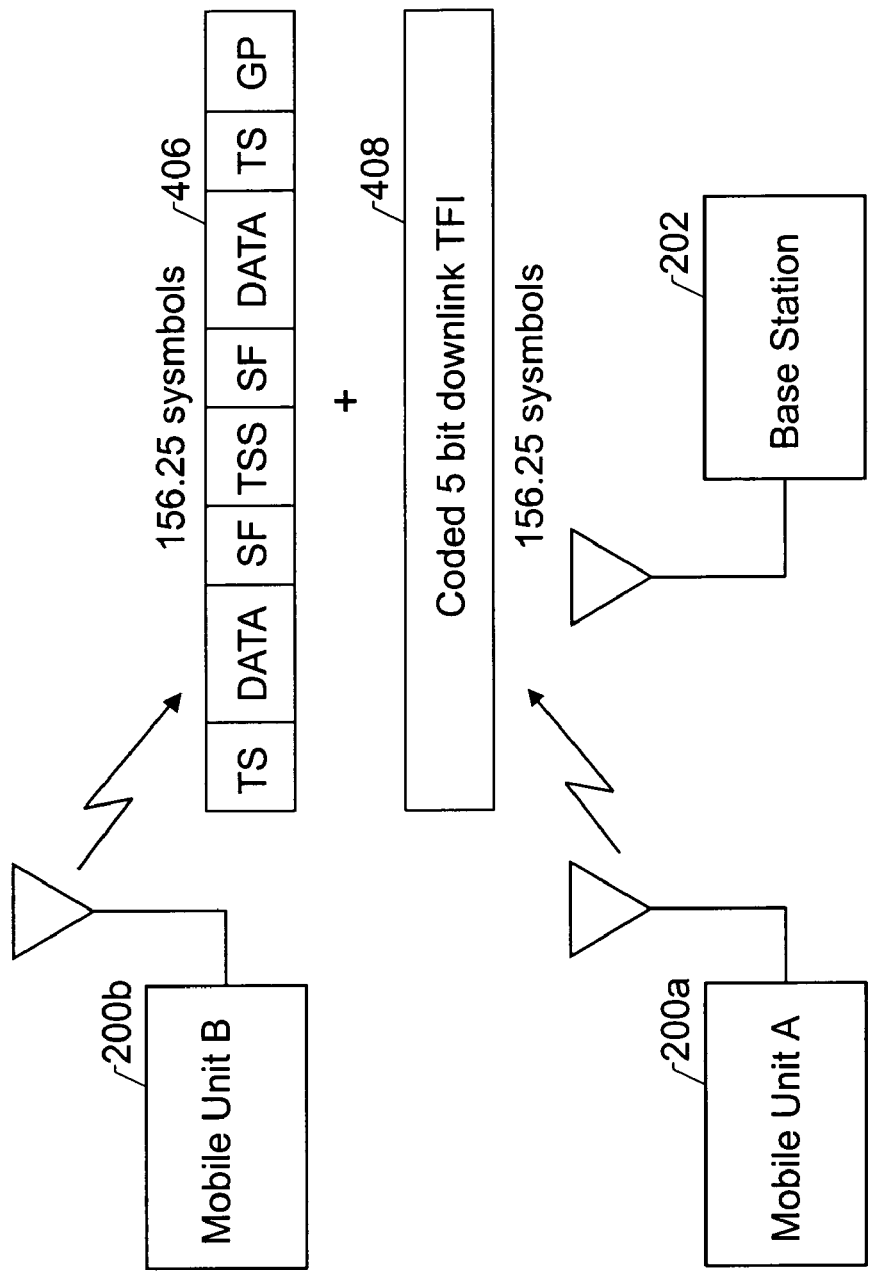
FIG. 9 illustrates a message transmitted by a first mobile station after exiting discontinuous transmission (DTX) mode to request allocation of the traffic channel portion that has been allocated to a second mobile station.

Referring to FIG. 9, while mobile station 200A (400) is in DTX mode, mobile station 200B (402) is transmitting bursts 406 over the allocated channel portion (time slot TNx). To request re-assignment of the channel portion, the mobile station 200A sends the RTRRM frame 408 in the same time slot that it was assigned during its previous talkspurt mode. However, the mobile station 200A can send RTRRM on a new time slot if the radio access network 11 sends PACCH on the downlink during the silence period of mobile station 200A to indicate a new time slot and/or frequency assignment.

In accordance with some embodiments, the RTRRM frame 408 includes the 5-bit TFI of the mobile station 200A. Normally, the TFI is used to identify one of multiple users on the same channel portion. In one embodiment, up to 32 users may be placed on the same channel portion, with the 5-bit TFI identifying one of the 32 users. In one embodiment, the 5 TFI bits are coded into 148 bits and sent over the entire burst 408, which in one embodiment is 156.25 symbols long (which corresponds to about 577 microseconds). Each information bit in the burst 408 has an information rate $f_b$ of about 8.667 kilobits per second (kb/s). In one example, the 5 TFI bits are coded by using a maximal length sequence at a chip rate $f_c$ equal to the EGPRS symbol rate of about 270.855 symbols per second, which results in a coding gain (CG) of 15 dB.

Each of the TFI bits is converted to one of two codes based on the state of the TFI bit. This coding is performed by the RRM generator 223 (FIG. 4A). If the TFI bit has state 0, then the bit is converted to the following 31-bit maximal length (ML) sequence:

Code-0=11110 11100 01010 11010 00011 00100 1.

If the TFI bit has state 1, then the bit is converted to the following ML sequence:

Code-1=11110 11001 11000 01101 01001 00010 1.

Since the TFI after coding results in a total of 155 bits (31×5), not 148, 7 bits are "punctured" or truncated. The punctured bits correspond to TFI bits 0 and 4; as a result, TFI bits 0 and 4 get less coding gain compared to the remaining TFI bits. In other embodiments, other coding schemes may be selected to achieve a more uniform coding gain for all five bits of TFI. In alternative embodiments, other codes can be used. Also, alternatively, instead of two codes, a single code can be used, with the states of the bits flipped to represent "0" and "1" states.

By using an RTRRM that is one burst in length, a relatively fast mechanism is enabled for re-assignment of the requested time slot back to the mobile station 200A. Also, to ensure reliable detection, RTRRM is transmitted at relatively high power, up to the maximum power permitted for the mobile station 200A. The transmission of the RTRRM burst 408 overlaps and coincides with the data traffic bursts 406 transmitted by the mobile station 402. To detect the presence of RTRRM despite this collision, the RTRRM detector 238 in the base station 202 uses joint detection or successive cancellation techniques, as further described below. Optionally, RTRRM may also be independently detected.

Collision between the RTRRM burst 408 and the traffic burst 406 may or may not cause the traffic burst 406 to be corrupted. If the traffic burst 406 is corrupted, then the base station 202 may request retransmission of the traffic burst 406 from the mobile station 200B. If the traffic burst 406 from the mobile station 200B contains speech data, then a speech frame substitution technique may be used to recover corrupted speech data. In one example, the speech frame substitution technique involves substituting a previously received speech frame in place of the present frame if the present frame is corrupted.

Figure 10:
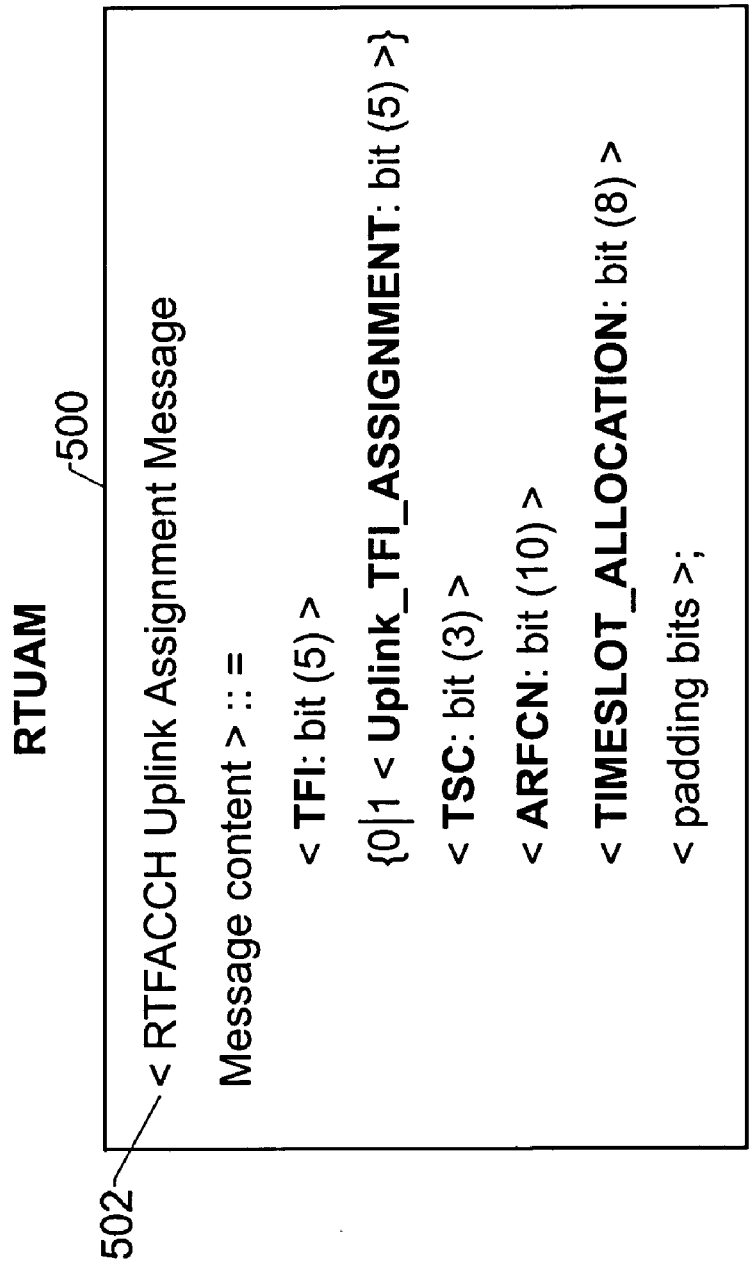
FIG. 10 illustrates an uplink assignment message to assign the channel portion back to the first mobile station.

Referring to FIG. 10, one embodiment of an RTUAM burst 500 is illustrated. The RTUAM burst 500 includes a header portion 502 that identifies the burst 500 as an RTUAM. The body of the RTUAM burst 500 includes the following: <TFI>, which represents the five-bit TFI; {0|1<Uplink_TFI_AS-SIGNMENT>}, which is used by the radio access network 11 to assign another TFI to the mobile station exiting DTX mode so that the mobile station transmits on a different time slot and/or RF frequency; <TSC>, which represents the training sequence code used for measuring co-channel interference; <ARFCN>, which represents the radio frequency of the channel assigned to the mobile station; <TIMESLOT_ALLOCATION>, which contains the time slot assignment for the mobile station; and padding bits.

The RTUAM burst 500 is one burst in length to decrease the delay in re-assigning a time slot back to a mobile station exiting DTX mode. This is particularly important for mobile stations communicating conversational class traffic, which are the most sensitive to delay of the four possible traffic classes. To prevent collision between the RTUAM burst 500 and other data on the downlink, the base station will preempt transmission of any other data on the downlink. To improve reliability in detection of RTUAM, repetition diversity may be employed, as explained below. Also, in further embodiments, an RTUAM burst having a larger length may be employed to improve reliability.

Figure 11:
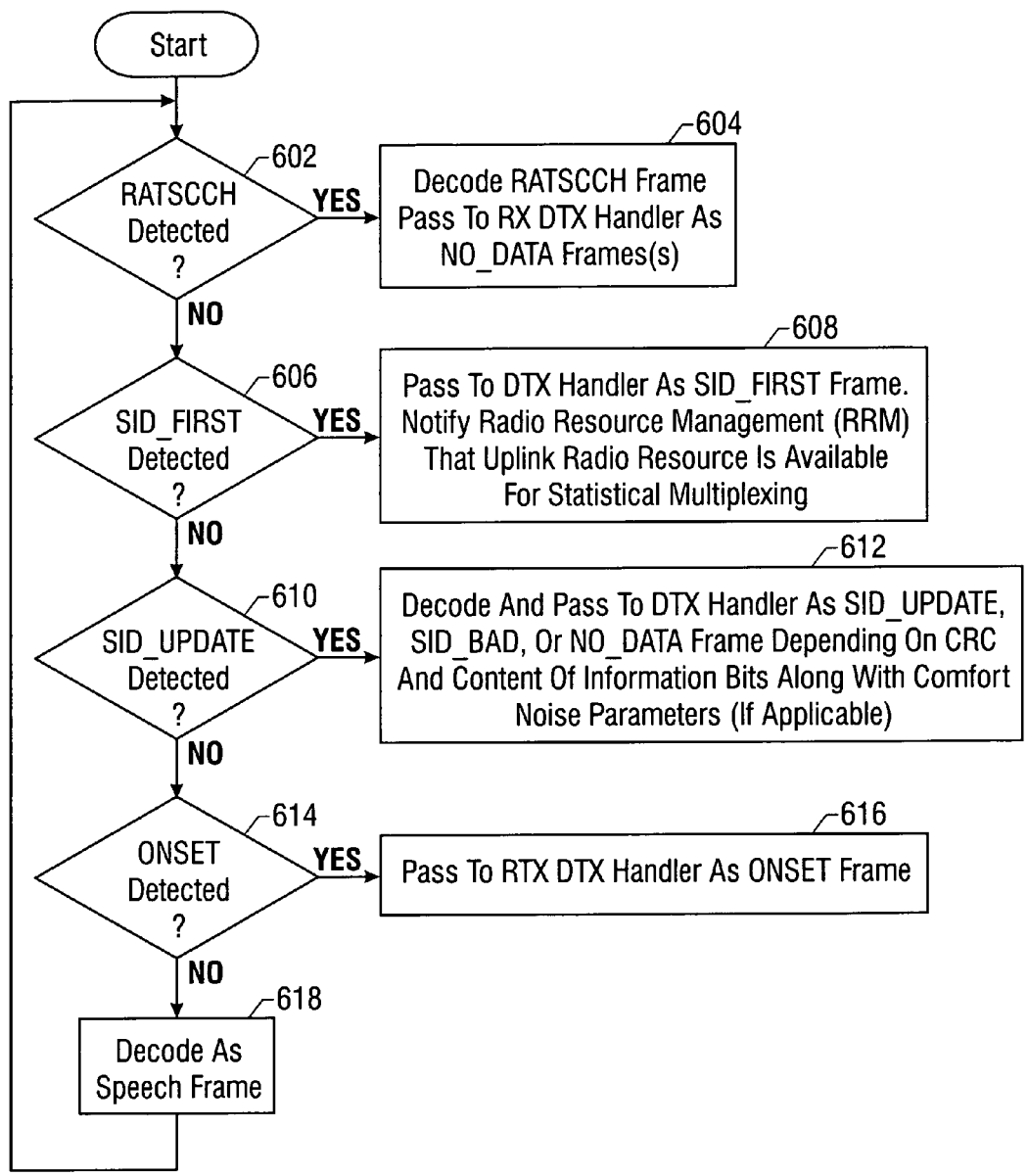
FIG. 11 is the flow diagram of a process performed by a base station, in accordance with an embodiment.

Referring to FIG. 11, processing of various messages by the base station is illustrated. If the base station detects receipt of a robust AMR (adaptive multi-rate) traffic synchronized control channel (RATSCCH), the base station decodes the RATSCCH frame (at 604). The RATSCCH frame is used to convey RATSCCH messages and to change CODEC configurations on the radio interface. The RATSCCH frame is passed to the RX DTX handler 250 as a NO_DATA frame.

If the base station detects (at 606) receipt of a SID_FIRST frame, the frame is passed to the RX DTX handler 250 as the SID_FIRST frame (at 608). In addition, the radio resource management (RRM) module 237 is notified that uplink radio resource is now available for statistical multiplexing. The base station also begins looking for an RTRRM burst, and if an RTRRM burst is received, a responsive RTUAM burst is transmitted to the mobile station.

The base station can also detect a SID_UPDATE frame (at 610). In response, the frame is decoded and passed (at 612) to the RX DTX handler 250 as SID_UPDATE, SID_BAD or NO_DATA frame depending on the CRC (cyclic redundancy check) and the content of information bits along with comfort noise parameters. Also, the base station checks to determine if the received message is a PACCH burst, PTCCH burst, or a PDTCH (packet data traffic channel) burst (containing RTCP or RSVP signaling). The purposes of these messages are discussed above. The base station continues to monitor for the RTRRM message, and if the RTRRM burst is detected, a responsive RTUAM burst is transmitted.

The base station can also detect (at 614) an ONSET frame, which is passed (at 616) to the RX DTX handler 250 as an ONSET frame. This indicates that an RTRRM burst has been detected, that the RTUAM has been transmitted in response to the RTRRM, and the RRM module 237 has been notified that the uplink radio resource is no longer available for statistical multiplexing.

If none of the RATSCCH, SID_FIRST, SID_UPDATE, and ONSET frames are detected, then the base station decodes (at 618) the received frame as a speech frame. If the SID_FIRST frame has been previously detected with no subsequent detection of the ONSET frame, then the base station continues to monitor for the RTRRM message.

In an EGPRS system, multiframes are used to communicate control and traffic signaling between mobile stations and base stations. The multiframes can include 52 frames, with each frame containing eight time slots. A multiframe starts with frame FN0 and ends with frame FN51. Four frames make up a block. Generally, conversational traffic is interleaved over eight frames, while traffic in the other traffic classes is interleaved over four frames.

Figure 12:
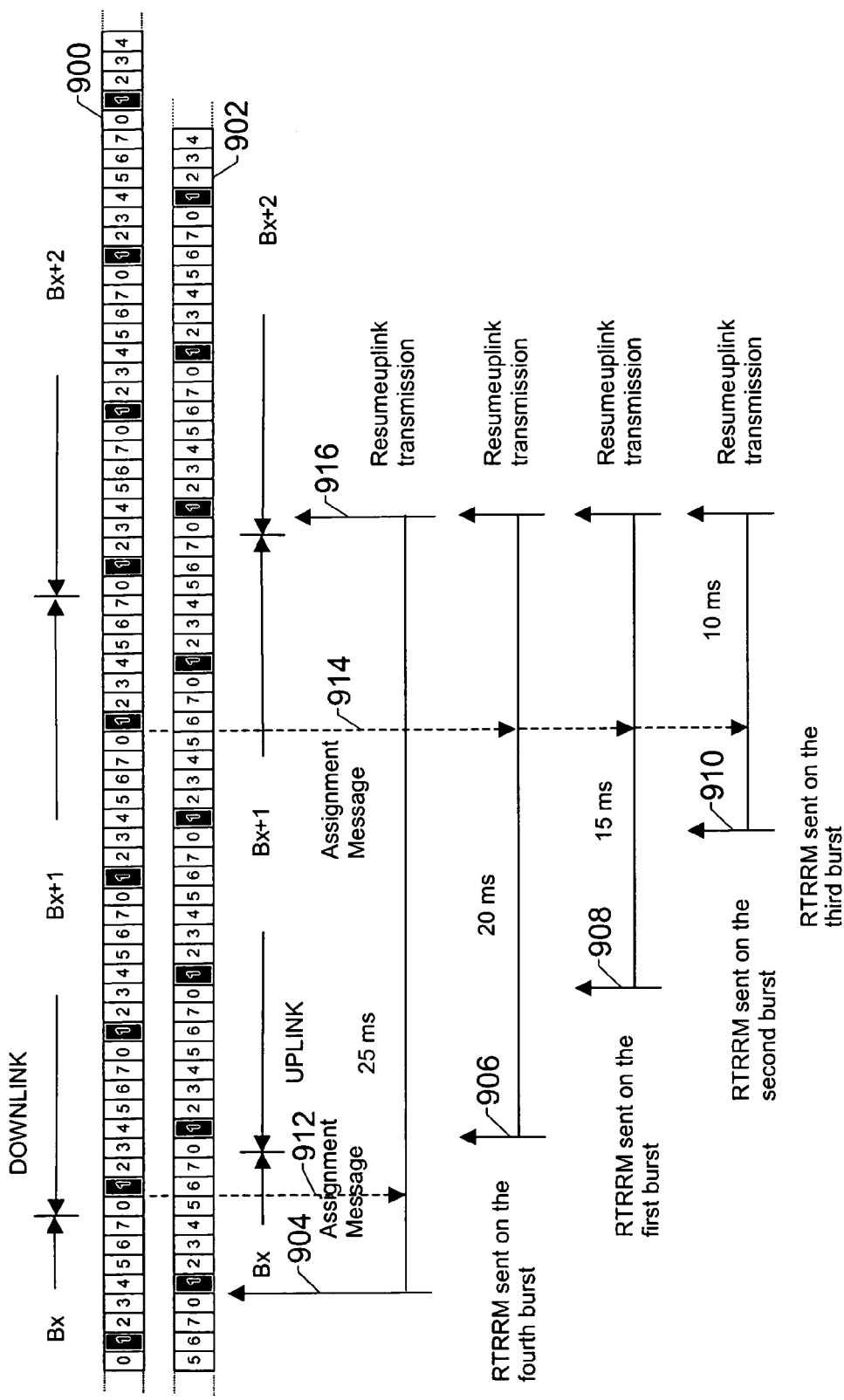
FIG. 12 illustrates the communications of a resource request message at different times and the communications of the responsive uplink assignment messages, in accordance with an embodiment.

Referring to FIG. 12, the relative timing between RTRRM, RTUAM, and resumption of uplink transmission is illustrated, given different times at which RTRRM is sent. A downlink stream 900 and an uplink stream 902 of frames are illustrated. In the example of FIG. 12, time slot TN1 is the time slot used for communications by a first mobile station (mobile station A). As shown in FIG. 12, the uplink stream is delayed with respect to the downlink stream by three time slots. The stream is divided into three blocks Bx, Bx+1, and Bx+2. Assuming that mobile station A is in the DTX mode, there are four different possible time periods within a block that the first mobile station can transmit RTRRM to request the channel back. In a first scenario, the RTRRM can be sent in the last burst (or time slot) of a block Bx (as indicated by 904). When this occurs, the RTUAM is not transmitted on the downlink (at 912) by the base station in the downlink path until the next block (Bx+1). In the next scenario, RTRRM can be transmitted in the uplink in the first burst of a block (Bx+1) (as indicated at 906). RTRRM can also be transmitted in the second and third bursts of block Bx+1 (as indicated by 908 and 910, respectively).

With RTRRM transmitted in the uplink path at 904 (the last burst of block Bx), the responsive RTUAM message is communicated in the first burst of the next block Bx+1 (as indicated by 912). However, for transmissions of RTRRM in the first, second and third bursts of block Bx+1 (906, 908, and 910, respectively), the RTUAM is communicated in the last burst of block Bx+1 (as indicated by 914) so that the base station has at least two or more bursts to detect the presence/absence of RTRRM on the uplink. In response to communication of RTUAM at 912 or 914, uplink traffic transmission from the first mobile station can resume in the first burst of the next block (Bx+2), as indicated by 916.

For improved reliability in detection of RTRRM, repetition diversity may be used, in which RTRRM is transmitted multiple times. This is possible when RTRRM is transmitted in the first or second bursts of a block (such as at 906 and 908 in FIG. 10). To enable repetition of RTRRM, RTUAM is transmitted in the last burst of the block.

Repetition diversity can also be used for RTUAM by sending it at different times. For example, if RTUAM is sent in the first burst of a block, then RTUAM may be repeated three more times. The plural RTUAM bursts are independent of each other (each is self-sufficient), and they may employ different parity protection to enhance error protection. However, if RTUAM is sent on the third or fourth burst of a block, then the base station may not be able to perform repetition diversity for RTUAM.

In accordance with some embodiments of the invention, the joint 238 detector (FIGS. 8A-8B) is used to simultaneously decode both RTRRM from a first mobile station and traffic from a second mobile station. As noted above, RTRRM comprises the 5-bit downlink TFI coded into 148 bits. The kth sample of the complex envelope of the received signal at the output of a base station receiver filter, r(kT) represented as $r_k$ can be expressed as follows, when RTRRM is not present:

$$r_k = \sum_{i=0}^{L-1} c_i s_{k-i} + \sum_{i=0}^{N-1} e_i I_k^{(i)} + n_k \quad \text{(Eq. 1)}$$

However, when RTRRM is present, $r_k$ is expressed as follows:

$$r_k = \sum_{i=0}^{L-1} c_i s_{k-i} + \sum_{i=0}^{L-1} d_i p_{k-i} + \sum_{i=0}^{N-1} e_i I_k^{(i)} + n_k \quad \text{(Eq. 2)}$$

In Eqs. 1 and 2 above, the value $s_k$ is the kth sample of the information signal from the mobile station B. The value $p_k$ is the kth sample of the RTRRM signal from the mobile station A, and $n_k$ is the kth sample of the receiver noise. Also, $I_k^{(i)}$ represents the kth sample of the ith interferer, $\{c_i\}$ and $\{d_i\}$ represent the channel impulse responses associated with mobile stations A and B, respectively. L is the length (in symbols) of the channel impulse response, and N represents the number of cochannel interferers. $\{e_i\}$ is the channel weight associated with the ith interferer. Here, it is assumed that the interferer is passed through a flat fading channel.

In a given maximum likelihood sequence estimator (MLSE), the jth branch metric, $\gamma_k^{(j)}$, at time instant k, is calculated in the absence of RTRRM as follows:

$$\gamma_k^{(j)} = \left| r_k - \sum_{i=0}^{L-1} \hat{c}_i F(I^{(i \to j)}) \right|^2 \quad \text{(Eq. 3)}$$

where $F(I^{(i \to j)})$ represents the symbol vector of traffic from mobile station A resulting from the transition from the ith state at time (k−1) to the jth state at time k. $\{\hat{c}_j\}$ represents the estimated channel impulse response.

The branch metric is modified to jointly decode the RTRRM from mobile station A and data from mobile station B as follows:

$$\gamma_k^{(j,m)} = \left| r_k - \sum_{i=0}^{L-1} \hat{c}_i F(I^{(i \to j)}) - \sum_{i=0}^{L-1} \hat{d}_i F(\text{Code} - m) \right|^2 \quad \text{(Eq. 4)}$$

where the third term on the right-hand side of Eq. 4 corresponds to RTRRM and has two possible states (m=0 or 1) corresponding to each of the two code waveforms (code-0 and code-1). Additionally, operations performed in decoding RTRRM include channel estimation during training sequence, $\{\hat{d}_i\}$, calculation of the branch metric corresponding to RTRRM for each of the two code waveforms (m=0 and 1), and determination of the downlink TFI of the MS THF.

Figure 13:
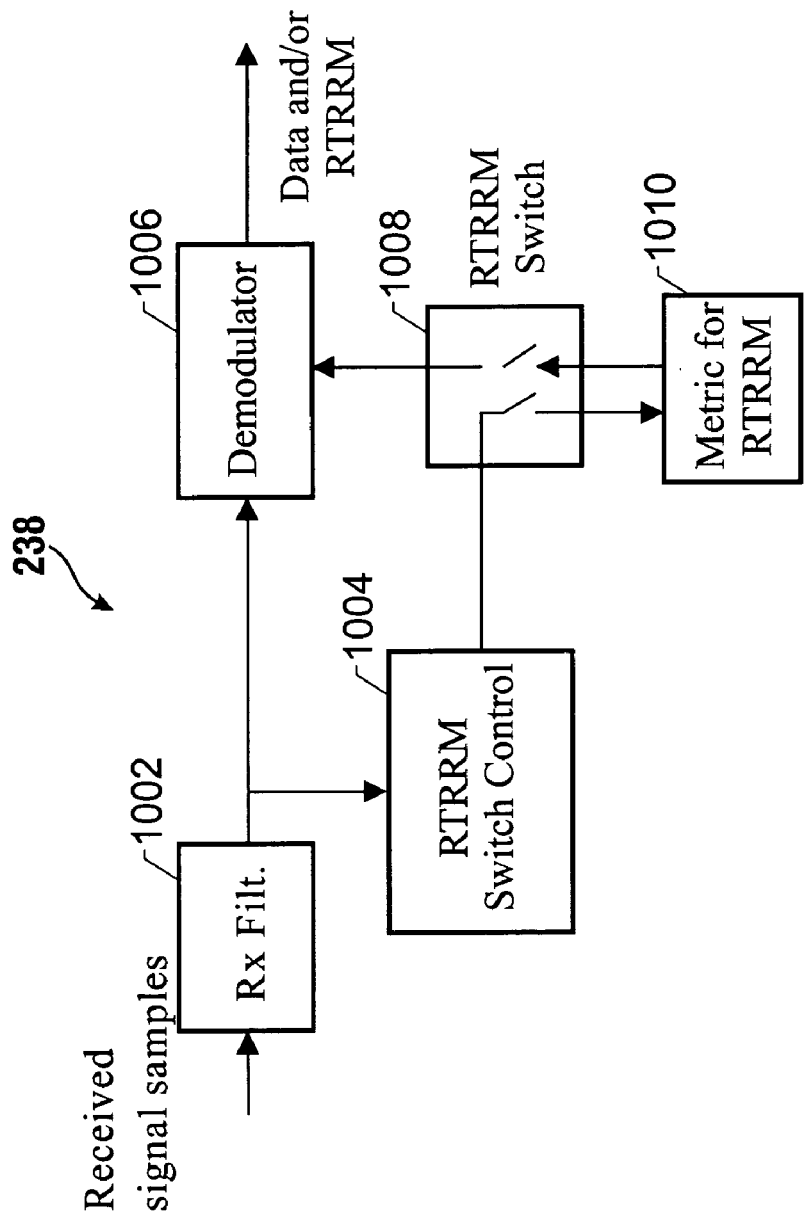
FIG. 13 is a block diagram of a circuit to detect for the resource request message, in accordance with one embodiment.

In one arrangement, the third term on the right-hand side of Eq. 4 can be calculated on a continuous basis to check for the presence of RTRRM. However, in another arrangement, the third term of the right-hand side of Eq. 4 does not need to be continuously calculated to reduce processing load. In this other arrangement, the third term on the right-hand side of Eq. 4 is calculated only when it has been determined that RTRRM is present. One example of the detector 238 configured according to the latter arrangement is illustrated in FIG. 13. Received signal samples are inputted to a receive filter 1002. The output of the receiver filter 1002 is provided to a demodulator 1006 and an RTRRM switch control module 1004. The RTRRM switch control module 1004 detects for the presence or absence of RTRRM in the received signal. When the switch control module 1004 detects the presence of RTRRM, it activates an RTRRM switch 1008, so that the metric for RTRRM (1010) can be provided to the demodulator 1006 to decode for RTRRM. Thus, in the example of FIG. 13, if the received signal does not contain RTRRM, the demodulator 1006 decodes the received signal into data (associated with mobile station B). However, if the received signal contains RTRRM, then the demodulator 1006 decodes RTRRM for use in the base station.

The operations, tasks, and functions discussed herein that are performed in stations or systems in the mobile communications network 10 may be controlled by software applications, routines, or modules executable on control units, such as those shown in FIGS. 8A-8B. Each control unit includes a microprocessor, microcontroller, processor card (including one or more microprocessors or microcontrollers), or another control or computing device. As used here, a "controller" or a "control module" refers to hardware, software, or a combination thereof. A "controller" or "control module" can refer to a single component or to multiple components (hardware or software).

The storage units referred to herein include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs), and flash memories; magnetic disks such as fixed, floppy and removable disks; other magnetic media including tape; and optical media such as compact disks (CDs) or digital video disks (DVDs). Instructions that make up the various software routines or modules in a station or system and stored in a respective storage unit when executed by a control unit cause the corresponding station or system to perform programmed acts.

The instructions of the software routines or modules are loaded or transported into the station or system in one of many different ways. For example, code segments including instructions stored on floppy disks, CD or DVD media, a hard disk, or transported through a network interface card, modem, or other interface device are loaded into the station or system and executed as corresponding software routines or modules. In the loading or transport process, data signals that are embodied in carrier waves (transmitted over telephone lines, network lines, wireless links, cables, and the like) communicate the code segments, including instructions, to the station or system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of interleaving data over a plurality of frames, comprising:
   interleaving, by a processor, the data according to a first algorithm over plural frames communicated over a wireless channel for a first set of data; and
   interleaving, by the processor, the data according to a second algorithm over plural frames communicated over the wireless channel for a second set of data,
   wherein interleaving the data according to the first or second algorithm comprises interleaving over frames of a multiframe,
   wherein the multiframe comprises plural blocks, each block having four frames, each frame containing plural bursts, and the data is carried in data frame N starting in block B(x), and wherein interleaving the data frame N according to the first and second algorithms comprises interleaving the data frame N over blocks B(x+2k) and B(x+2k+2), where k=INT(N/2).

2. The method of claim 1, wherein interleaving the data according to the first algorithm comprises interleaving the data frame N over bursts in the last three frames in block B(x+2k) and the first frame in block B(x+2k+2), if N is even.

3. The method of claim 2, wherein interleaving the data according to the second algorithm comprises interleaving the data frame N over bursts in the last frame in block B(x+2k) and the first three frames in block B(x+2k+2), if N is odd.

4. The method of claim 3, wherein interleaving the data according to the first and second algorithms comprises interleaving speech data.

5. The method of claim 4, wherein interleaving the speech data comprises interleaving speech data of a half-rate mobile station.

6. The method of claim 3, further comprising:
   receiving an end-of-data indicating frame to indicate that the data frame N is the last data frame; and
   interleaving the end-of-data indicating frame over bursts in the last frame in block B(x+2k) and the first two frames of block (Bx+2k+2), if M is even.

7. The method of claim 6, further comprising repeating the end-of-data indicating frame over bursts in the last two frames of block B(x+2k+2).

8. The method of claim 6, further comprising interleaving the end-of-data indicating frame over bursts in the last three frames of block B(x+2k+2), if M is odd.

9. A method of interleaving data over a plurality of frames, comprising:
   interleaving, by a processor, the data according to a first algorithm over plurality of frames communicated over a wireless channel for a first set of data; and
   interleaving, by the processor, the data according to a second algorithm over plural frames communicated over the wireless channel for a second set of data,
   wherein interleaving the data according to the first or second algorithm comprises interleaving over frames of a multiframe,
   wherein the multiframe comprises plural blocks and each block comprises plural frames, each frame containing plural bursts, the data being carried in data frames interleaved over bursts in the plural frames, the method further comprising:
   receiving an end-of-data indicating frame to indicate that a data frame is the last data frame; and
   interleaving the end-of-data indicating frame according to at least one predetermined algorithm,
   wherein interleaving the data frames according to the first and second algorithms and the end-of-data indicating frame according to the at least one predetermined algorithm enables the end-of-data indicating frame to end within the same block carrying the last data frame,
   wherein the last data frame is data frame M starting in block B(x), wherein, if M is odd, interleaving the data frame M comprises interleaving the data frame M over bursts in the last frame in block B(x) and the first three frames of B(x+2), and wherein interleaving the end-of-data indicating frame comprises interleaving the end-of-data indicating frame over bursts in the last three frames of block B(x+2).

10. The method of claim 9, wherein, if M is even, interleaving the data frame M comprises interleaving the data frame M over bursts in the last three frames in block B(x) and first frame in block B(x+2), and interleaving the end-of-data indicating frame comprises interleaving the end-of-data indicating frame over bursts in the last frame in block B(x) and first two frames in block B(x+2).

11. The method of claim 10, wherein the end-of-data indicating frame comprises a SID_FIRST frame according to a General Packet Radio Service protocol.

12. A system for communicating over a wireless channel in a mobile communications network, comprising:
    an interface adapted to receive traffic data frames from a half-rate mobile station; and
    a controller adapted to process a first data frame interleaved over plural bursts according to a first algorithm and to process a second data frame interleaved over plural bursts according to a second algorithm,
    wherein the bursts are part of a multiframe, the multiframe comprising plural blocks, each block comprising four bursts, and wherein data frames I, I=0 to M, are received starting in block B(x), the controller adapted to interleave data frame I over blocks B(x+2k) and B(x+2k+2), where k=INT(I/2).

13. The system of claim 12, wherein the controller is adapted to:
    for I being even, interleave traffic data frame I over the last three bursts in block B(x+2k) and the first burst in block B(x+2k+2); and
    for I being odd, interleave traffic data frame I over the last three bursts in block B(x+2k) and the first burst in block B(x+2k+2).

14. The system of claim 13, wherein the interface is adapted to further receive an end-of-data indicating frame, the end-of-data indicating frame interleaved a first way if M is even and a second way if M is odd.

15. The system of claim 14, wherein the controller is adapted to:
    for M being even, interleave the end-of-data indicating frame over the last burst in block B(x+2k) and the first two bursts in block B(x+2k+2); and
    for M being odd, interleave the end-of-data indicating frame over the last three bursts of B(x+2k+2).

16. The system of claim 15, wherein the end-of-data indicating frame comprises a SID_FIRST frame according to a General Packet Radio Service protocol.

17. The system of claim 15, wherein the end-of-data indicating frame indicates that discontinuous transmission mode is starting.

18. The system of claim 15, wherein the traffic data frames are carried in a wireless channel portion, the interface adapted to receive traffic data frames from another mobile station in block B(x+2k+4).

19. The system of claim 18, wherein the traffic data frames from the half-rate mobile station comprises speech data.

20. The system of claim 19, wherein the traffic data frames from the other mobile station comprises another type of data.

21. The system of claim 19, wherein the other mobile station comprises a full-rate mobile station.

22. An article comprising at least one storage medium containing instructions that when executed cause a mobile station to:
interleave a first speech traffic frame n in a communications session with a radio network over plural bursts according to a first algorithm, wherein n is an even number;
interleave a second speech traffic frame n+1 in the communications session with the radio network over plural bursts according to a second algorithm, wherein n+1 is an odd number, wherein the first speech traffic frame n is interleaved according to the first algorithm in response to n being an even number, and the second speech traffic frame n+1 is interleaved according to the second algorithm in response to n+1 being an odd number; and
cause the first and second interleaved speech traffic frames to be transmitted to the radio network in the communications session.

23. A system for communicating over a wireless channel in a mobile communications network, comprising:
an interface adapted to receive traffic data frames from a half-rate mobile station; and
a controller adapted to process a first data frame n, n being an even number, from the half-rate mobile station interleaved over plural bursts according to a first algorithm and to process a second data frame n+1, n+1 being an odd number, from the half-rate mobile station interleaved over plural bursts according to a second algorithm,
wherein the first data frame n is interleaved according to the first algorithm in response to n being an even number, and the second data frame is interleaved according to the second algorithm in response to n+1 being an odd number.

24. The system of claim 23, wherein the first and second data frames comprise respective first and second speech frames.

25. The system of claim 23, wherein each data frame is interleaved over four bursts.

26. The system of claim 23, wherein the bursts are part of a multiframe, the multiframe having plural blocks,
wherein the first data frame n is interleaved according to the first algorithm by interleaving the first data frame n in bursts of two different blocks, the two different blocks selected based on n being an even number, and
wherein the second data frame n+1 is interleaved according to the second algorithm by interleaving the second data frame n+1 in bursts of two different blocks, the two different blocks selected based on n+1 being an odd number.

27. An article comprising at least one storage medium containing instructions that when executed cause a system to:
receive traffic over a wireless channel portion from a first mobile station involved in half-rate communication;
detect that the first mobile station has entered discontinuous transmission mode;
in response to detecting that the first mobile station has entered discontinuous transmission mode, re-assign the wireless channel portion to a second mobile station to enable multiplexing of traffic from the second mobile station onto the wireless channel portion while the first mobile station is in discontinuous transmission mode;
receive a request from the first mobile station to re-acquire the wireless channel portion, the request transmitted by the first mobile station in response to the first mobile station exiting discontinuous transmission mode; and
send an assignment message to the first mobile station to assign the wireless channel portion in response to the request.

28. The article of claim 27, wherein the instructions when executed cause the system to:
receive speech traffic from the first mobile station over the wireless channel portion.

29. The article of claim 28, wherein the instructions when executed cause the system to receive another type of traffic from the second mobile station.

30. The article of claim 27, wherein the instructions when executed cause the system to interleave a first traffic frame from the first mobile station over plural bursts according to a first algorithm and to interleave a second traffic frame from the first mobile station over plural bursts according to a second algorithm.

31. A system for use in a mobile communications network, comprising:
a wireless interface adapted to receive traffic over a wireless channel portion from a first mobile station involved in half-rate communications; and
a controller adapted to receive an indication that the first mobile station has entered discontinuous transmission mode and, in response to receiving the indication that the first mobile station has entered discontinuous transmission mode, to multiplex traffic from a second mobile station onto the wireless channel portion while the first mobile station is in discontinuous transmission mode,
wherein the controller is adapted to further:
receive a request from the first mobile station to re-acquire the wireless channel portion, the request transmitted by the first mobile station in response to the first mobile station exiting discontinuous transmission mode; and
send an assignment message to the first mobile station to assign the wireless channel portion in response to the request.

* * * * *

UNITED STATES PATENT AND TRADEMARK OFFICE
CERTIFICATE OF CORRECTION

PATENT NO. : 7,586,949 B1 Page 1 of 1
APPLICATION NO. : 09/715787
DATED : September 8, 2009
INVENTOR(S) : Barany et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2786 days.

Signed and Sealed this

Twenty-first Day of September, 2010

David J. Kappos
*Director of the United States Patent and Trademark Office*